(12) United States Patent
Wang et al.

(10) Patent No.: US 12,045,990 B2
(45) Date of Patent: Jul. 23, 2024

(54) IMAGE RECOGNITION METHOD AND RELATED APPARATUS BASED ON ARTIFICIAL INTELLIGENCE

(71) Applicant: TENCENT TECHNOLOGY (SHENZHEN) COMPANY LIMITED, Shenzhen (CN)

(72) Inventors: Ruichen Wang, Shenzhen (CN); Xiaoli Wang, Shenzhen (CN); Guixia Yan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 455 days.

(21) Appl. No.: 17/407,140

(22) Filed: Aug. 19, 2021

(65) Prior Publication Data

US 2021/0383549 A1    Dec. 9, 2021

Related U.S. Application Data

(63) Continuation of application No. PCT/CN2020/090787, filed on May 18, 2020.

(30) Foreign Application Priority Data

Jun. 4, 2019    (CN) .......................... 201910481441.0

(51) Int. Cl.
*G06T 7/11*    (2017.01)
*G06T 7/149*    (2017.01)
(Continued)

(52) U.S. Cl.
CPC ............... *G06T 7/11* (2017.01); *G06T 7/149* (2017.01); *G06V 10/25* (2022.01); *G06V 10/26* (2022.01);
(Continued)

(58) Field of Classification Search
CPC . G06T 7/11; G06T 7/149; G06T 2207/20084; G06V 10/25; G06V 10/26;
(Continued)

(56) References Cited

U.S. PATENT DOCUMENTS

2017/0004628 A1    1/2017    Jumpasut et al.

FOREIGN PATENT DOCUMENTS

| CN | 108022243 A | 5/2018 |
|---|---|---|
| CN | 109447994 A | 3/2019 |
| CN | 110276344 A | 9/2019 |

OTHER PUBLICATIONS

"K.-K. Maninis et. al., Deep Extreme Cut: From Extreme Points to Object Segmentation, Proceedings of IEEE Conference on Computer Vision and Pattern Recognition CVPR, 2018, pp. 616-625" (Year: 2018).*

(Continued)

*Primary Examiner* — Andrae S Allison
*Assistant Examiner* — Phuong Hau Cai
(74) *Attorney, Agent, or Firm* — ANOVA LAW GROUP, PLLC

(57) ABSTRACT

An image recognition method includes obtaining an image to be segmented. The image includes a plurality of extremum points. Image feature information is generated according to the image and includes N image matrices and a heat map. The heat map is generated according to the plurality of extremum points. An image segmentation region is determined corresponding to the image feature information through an image segmentation model. The image segmentation model includes N matrix input channels and a heat map input channel, the N matrix input channels have a one-to-one correspondence with the N image matrices, and the heat map input channel have a correspondence with the heat map. The method also includes generating an image (Continued)

recognition result of the image according to the image segmentation region.

20 Claims, 10 Drawing Sheets

(51) Int. Cl.
| | |
|---|---|
| G06V 10/25 | (2022.01) |
| G06V 10/26 | (2022.01) |
| G06V 10/44 | (2022.01) |
| G06V 10/46 | (2022.01) |
| G06V 10/48 | (2022.01) |
| G06V 10/82 | (2022.01) |

(52) U.S. Cl.
CPC ............ *G06V 10/44* (2022.01); *G06V 10/462* (2022.01); *G06V 10/48* (2022.01); *G06V 10/82* (2022.01)

(58) Field of Classification Search
CPC ...... G06V 10/44; G06V 10/462; G06V 10/48; G06V 10/82; G06V 10/40
See application file for complete search history.

(56) References Cited

OTHER PUBLICATIONS

E. Boopathi Kumar et. al., Color Channel Extraction in RGB Images for Segmentation, Mar. 2018, 2017 2nd International Conference on Communication and Electronics Systems, IEEE, India (Year: 2017).*

"Thangarajah Akilan et. al., Double Encoding—Slow Decoding Image to Image CNN for Foreground Identification with Application Towards Intelligent Transportation, Jul. 2018, IEEE Confs on Internet of Things, Green Computing and Communications, Cyber" (Year: 2018).*

"Thangarajah Akilan et. al., A 3D CNN-LSTM-Based Image-to-Image Foreground Segmentation, Mar. 2019, IEEE Transactions on Intelligent Transportation Systems, vol. 21, Issue 3" (Year: 2019).*

"Xiaolu Sun et. al., Free-Shape Polygonal Object Localization, 2014, European Conference on Computer Vision, Computer Vision—ECCV 2014, pp. 317-332" (Year: 2017).*

"Jimei Yang, et. al., Object Contour Detection with a Fully Convolutional Encoder-Decoder Network, 2016, proceedings of the IEEE Conference on Computer Vision and Pattern Recognition, pp. 193-202" (Year: 2016).*

The World Intellectual Property Organization (WIPO) International Search Report for PCT/CN2020/090787 Aug. 19, 2020 3 Pages (including translation).

K.-K. Maninis et al., "Deep Extreme Cut: From Extreme Points to Object Segmentation," 2018IEEE/CVF Conference on Computer Vision and Pattern Recognition, Dec. 31, 2018 (Dec. 31, 2018), pp. 616-625. 10 pages.

Dim P. Papadopoulos et al, "Extreme clicking for efficient object annotation," 2017 IEEE International Conference on Computer Vision (ICCV), Dec. 31, 2017 (Dec. 31, 2017), pp. 4930-4939. 10 pages.

Yong Mu Zi Zuo, "Encoder-Decoder with Atrous Separable Convolution for Semantic Image Segmentation (DeepLab v3 plus) paper notes," Retrieved from the Internet:URL: https://blog.csdn.net/Lin_Danny/article/details/87924277, Feb. 25, 2019 (Feb. 25, 2019). 37 pages (including translation).

Mykhaylo Andriluka et al., "Fluid Annotation: A Human-Machine Collaboration Interface for Full Image Annotation," 2018 ACM Multimedia Conference on Multimedia Conference. ACM, 2018. 10 pages.

David Acuna et al., "Efficient Interactive Annotation of Segmentation Datasets with Polygon-RNN++," Proceedings of the IEEE Conference on Computer Vision and Pattern Recognition. 2018, pp. 859-868. 10 pages.

University of Toronto, "PolygonRNN++ Demo," Retrieved from the Internet: http://www.cs.toronto.edu/~amlan/demo/, retrieved on Aug. 18, 2021. 1 page.

Liang-Chieh Chen et al., "DeepLab: Semantic Image Segmentation with Deep Convolutional Nets, Atrous Convolution, and Fully Connected CRFs," arXiv:1606.00915, May 12, 2017. 14 pages.

Liang-Chieh Chen et al., "Encoder-Decoder with Atrous Separable Convolution for Semantic Image Segmentation," Proceedings of the European Conference on Computer Vision (ECCV). 2018. 18 pages.

The European Patent Office (EPO) the Extended European Search Report for 20819540.4 Jun. 27, 2022 10 pages.

Xingyi Zhou et al., "Bottom-up Object Detection by Grouping Extreme and Center Points," arXiv:1901.08043v2, Feb. 3, 2019. 10 pages.

K.-K. Maninis et al., "Deep Extreme Cut: From Extreme Points to Object Segmentation," arXiv:1711.09081v2, Mar. 27, 2018. 10 pages.

Dim P. Papadopoulos et al., "Extreme Clicking for Efficient Object Annotation," 2017 IEEE International Conference on Computer Vision (ICCV) , IEEE, Oct. 22, 2017 (Oct. 22, 2017), pp. 4940-4949. 10 pages.

Yong Wood, "Encoder-Decoder with Atrous Separable Convolution for Semantic Image Segmentation (DeepLab v3+) Paper Notes," csdn, Feb. 25, 2019 (Feb. 25, 2019), pp. 1-14. Retrieved from the Internet:URL: https://blog.csdn.net/Lin_Danny/article/details/87924277 [retrieved on Jul 7, 2022]. 24 pages.

* cited by examiner (a)

(b)

(c)

(d)

IMAGE RECOGNITION METHOD AND RELATED APPARATUS BASED ON ARTIFICIAL INTELLIGENCE

CROSS-REFERENCES TO RELATED APPLICATIONS

This application is a continuation application of PCT Patent Application No. PCT/CN2020/090787, entitled "ARTIFICIAL INTELLIGENCE-BASED IMAGE RECOGNITION METHOD AND RELATED DEVICE" and filed on May 18, 2020, which claims priority to Chinese Patent Application No. 201910481441.0, entitled "IMAGE SEGMENTATION METHOD, IMAGE RECOGNITION METHOD, AND RELATED APPARATUS" filed with the China National Intellectual Property Administration on Jun. 4, 2019, the entire contents of both of which are incorporated herein by reference.

FIELD OF THE TECHNOLOGY

The present disclosure relates to the field of artificial intelligence, and in particular, to image recognition.

BACKGROUND OF THE DISCLOSURE

Accompanied with the development of computer technologies, an image segmentation technology is applied more and more widely, for example, applied to medical image segmentation and natural image segmentation. The image segmentation technology is a technology of segmenting an image into several particular regions having special properties, and specifying a target of interest. For example, in a human tissue image segmentation scenario, a medical image can be segmented, so that various human tissues can be clearly distinguished in segmented images.

SUMMARY

Embodiments of the present disclosure provide an image recognition method and a related apparatus based on artificial intelligence, a heat map generated by using extremum points is used as part of image feature information to enrich features of an image, and to further generate a more accurate image segmentation region, thereby enhancing versatility and applicability of image segmentation.

In view of this, one aspect of the present disclosure provides an image segmentation method, including: obtaining an image to be segmented, the image including a plurality of extremum points; generating image feature information according to the image, the image feature information including N image matrices and a heat map, and the heat map being generated according to the plurality of extremum points; determining an image segmentation region corresponding to the image feature information through an image segmentation model, the image segmentation model including N matrix input channels and a heat map input channel, the N matrix input channels having a one-to-one correspondence with the N image matrices, and the heat map input channel having a correspondence with the heat map; and generating an image recognition result of the image according to the image segmentation region.

Another aspect of the present disclosure provides an image recognition apparatus, including: an obtaining module, configured to obtain an image to be segmented, the image including a plurality of extremum points; a generation module, configured to generate image feature information according to the image obtained by the obtaining module, the image feature information including N image matrices and a heat map, the heat map being generated according to the plurality of extremum points, and N being an integer greater than or equal to 1, the obtaining module being further configured to determine an image segmentation region corresponding to the image feature information generated by the generation module through an image segmentation model, the image segmentation model including N matrix input channels and a heat map input channel, the N matrix input channels having a one-to-one correspondence with the N image matrices, and the heat map input channel having a correspondence with the heat map; and the generation module being further configured to generate an image recognition result of the image according to the image segmentation region obtained by the obtaining module.

Another aspect of the present disclosure provides a terminal device, including: a memory, a transceiver, a processor, and a bus system; the memory being configured to store a program; the processor being configured to execute the program in the memory, including the following operations: obtaining an image to be segmented, the image including a plurality of extremum points; generating image feature information according to the image, the image feature information including N image matrices and a heat map, and the heat map being generated according to the plurality of extremum points; determining an image segmentation region corresponding to the image feature information through an image segmentation model, the image segmentation model including N matrix input channels and a heat map input channel, the N matrix input channels having a one-to-one correspondence with the N image matrices, and the heat map input channel having a correspondence with the heat map; and generating an image recognition result of the image according to the image segmentation region. The bus system is configured to connect the memory and the processor, to enable the memory and the processor to perform communication.

Another aspect of the present disclosure provides a non-transitory computer-readable storage medium, the storage medium being configured to store a computer program, the computer program being configured to perform the method according to the foregoing aspects.

It can be seen from the foregoing technical solutions that the embodiments of the present disclosure have the following advantages.

In an embodiment of the present disclosure, an image segmentation method is provided. First, a to-be-segmented image is obtained, the to-be-segmented image including a plurality of extremum points. Next, image feature information is generated according to the to-be-segmented image, the image feature information including N image matrices and a heat map, and the heat map being generated according to the plurality of extremum points. Then, an image segmentation region corresponding to the image feature information is obtained through an image segmentation model, the image segmentation model including N matrix input channels and a heat map input channel, the N matrix input channels having a one-to-one correspondence with the N image matrices, and the heat map input channel having a correspondence with the heat map. Finally, an image recognition result of the to-be-segmented image is generated according to the image segmentation region. By using the foregoing method, there is no need to consider whether a target meets a specific type, and a heat map generated by using extremum points is used as part of image feature information to enrich feature contents of an image, so that an image segmentation model can generate a more accurate image segmentation region according to the image feature information, thereby enhancing the versatility and applicability of image segmentation.

DESCRIPTION OF EMBODIMENTS

Figure 1:
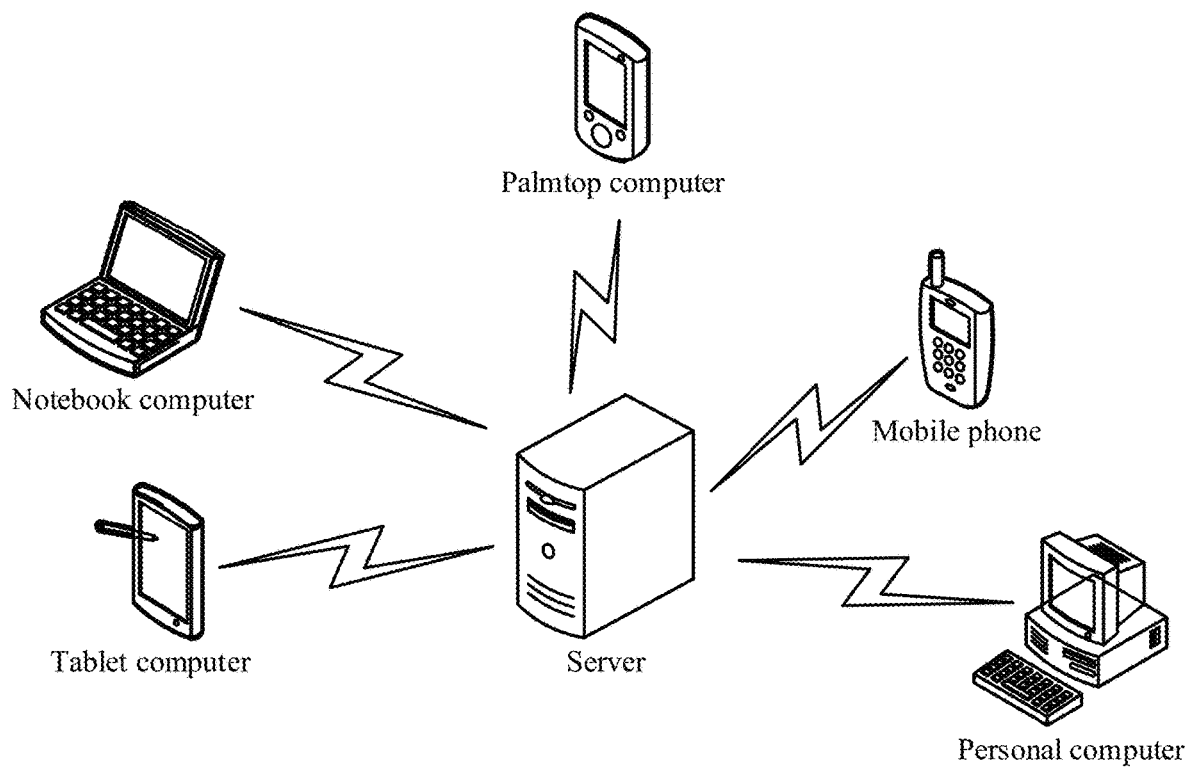
FIG. 1 is a schematic architectural diagram of an image recognition system according to an embodiment of the present disclosure.

Embodiments of the present disclosure provide an image segmentation method, an image recognition method, and a related apparatus, a heat map generated by using extremum points is used as part of image feature information to enrich features of an image, and to further generate a more accurate image segmentation region, thereby enhancing versatility and applicability of image segmentation.

The terms such as "first", "second", "third", and "fourth" (if any) in the specification and claims of the present disclosure and in the accompanying drawings are used for distinguishing similar objects and not necessarily used for describing any particular order or sequence. It is to be understood that data used in this way is interchangeable in a suitable case, so that the embodiments of the present disclosure described herein can be implemented in a sequence in addition to the sequence shown or described herein. In addition, the terms "include", "corresponding to", and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that an image segmentation method and an image recognition method provided in the present disclosure are applicable to the field of artificial intelligence, and specifically may be applied to the field of computer vision. With the continuous development of computer science and technology, image processing and analysis gradually forms a set of scientific systems, and new processing methods emerge in an endless stream. Although having a short development history, the image processing and analysis attracts widespread attention from people from all walks of life. First, vision is the most important means of human perception, and images are the foundation of the vision. Therefore, digital images become an effective tool for scholars in many fields such as psychology, physiology, and computer science to study visual perception. Secondly, there is a growing demand for image processing in large-scale applications such as military, remote sensing, and meteorology. An image segmentation technology is always a basic technology and an important research direction in the field of computer vision. Specifically, the image segmentation technology is to separate a region of interest (such as a person, a car, and a building) from an image according to a true contour. The image segmentation technology is an important part of image semantic understanding. In recent years, with the development of neural networks, the image processing capability is significantly improved, and the image segmentation technology also plays a more important role in the fields of medical image analysis (including localization of tumors and other pathologies, measurement of tissue volume, computer-assisted surgery, regimen establishment, and research on anatomical structures), face recognition, fingerprint recognition, unmanned driving, and machine vision.

For ease of understanding, refer to FIG. 1. FIG. 1 is a schematic architectural diagram of an image recognition system according to an embodiment of the present disclosure. As shown in the figure, an image processing device provided in the present disclosure includes a terminal device or a server, for example, may be a terminal device deployed with a client. The client may be specifically an auxiliary segmentation tool. The terminal device deployed with the client includes, but is not limited to, a tablet computer, a notebook computer, a palmtop computer, a mobile phone, a voice interaction device, and a personal computer (PC), and is not limited herein.

To facilitate users to annotate an image segmentation dataset, the present disclosure provides an interactive image auxiliary segmentation tool based on a neural network model (that is, an image segmentation model). In a task of image segmentation and annotation, the auxiliary segmentation tool can feed back a more accurate pre-segmentation result (that is, an image segmentation region is obtained) through the neural network model (that is, the image segmentation model) only by obtaining a small amount of user interaction behaviors. Then, a user can obtain a final segmentation result (that is, a target segmentation region is obtained) by making a small amount of modification based on the pre-segmentation result (that is, the image segmentation region), or even without modification. The present disclosure provides a "four-point interaction" segmentation method, and improves an original image segmentation model, thereby obtaining a better segmentation result and real-time tool performance.

The image segmentation model may be deployed in a server that is used as an image processing device, and an image segmentation region is predicted by using the image segmentation model, so as to achieve online image segmentation. In some embodiments, the image segmentation model may be deployed on a terminal device that is used as an image processing device, and an image segmentation region is predicted by using the image segmentation model, so as to achieve offline image segmentation.

Figure 2:
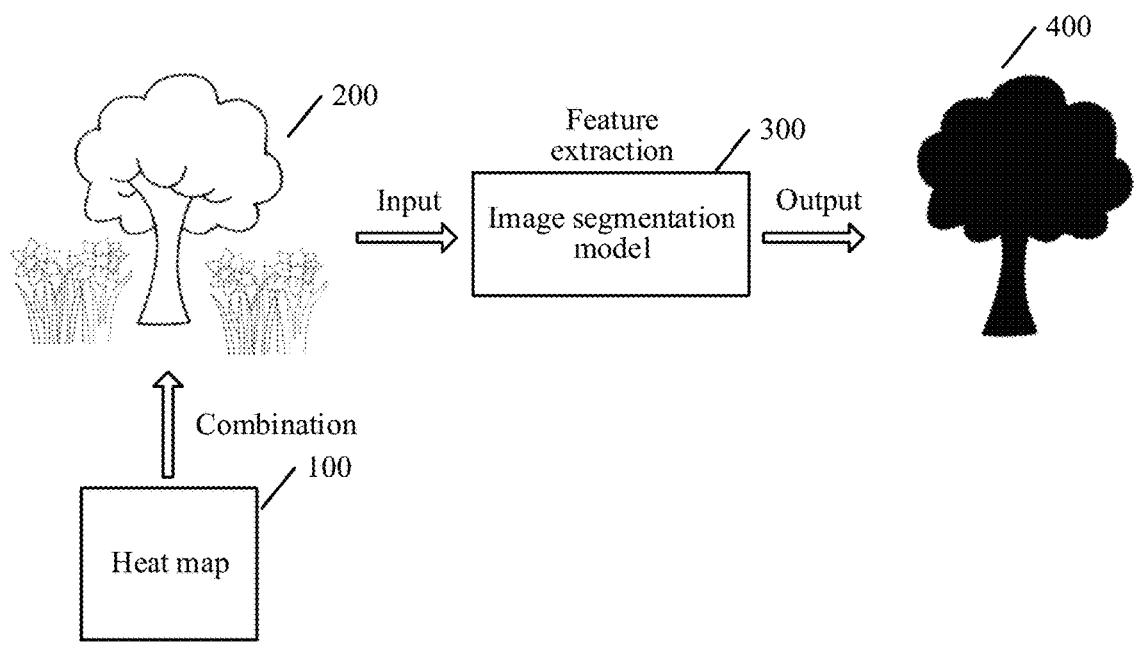
FIG. 2 is a schematic structural diagram of an image segmentation model according to an embodiment of the present disclosure.

Refer to FIG. 2. FIG. 2 is a schematic structural diagram of an image segmentation model according to an embodiment of the present disclosure. As shown in the figure, a user annotates extremum points of a to-be-processed image by using an auxiliary segmentation tool, for example, annotating a tree in FIG. 2, the auxiliary segmentation tool generates a heat map 100 according to a result of user annotation, and the heat map 100 is combined with an image matrix 200 of the to-be-processed image, to obtain image feature information. The image feature information is inputted to an image segmentation model 300, features are extracted through the image segmentation model 300, to output an image segmentation region 400, for example, a black tree region shown in FIG. 2. The image segmentation model may be an image segmentation convolutional neural network (CNN), and a model structure thereof mainly includes an input layer, a feature extraction layer, and an output layer.

Figure 3:
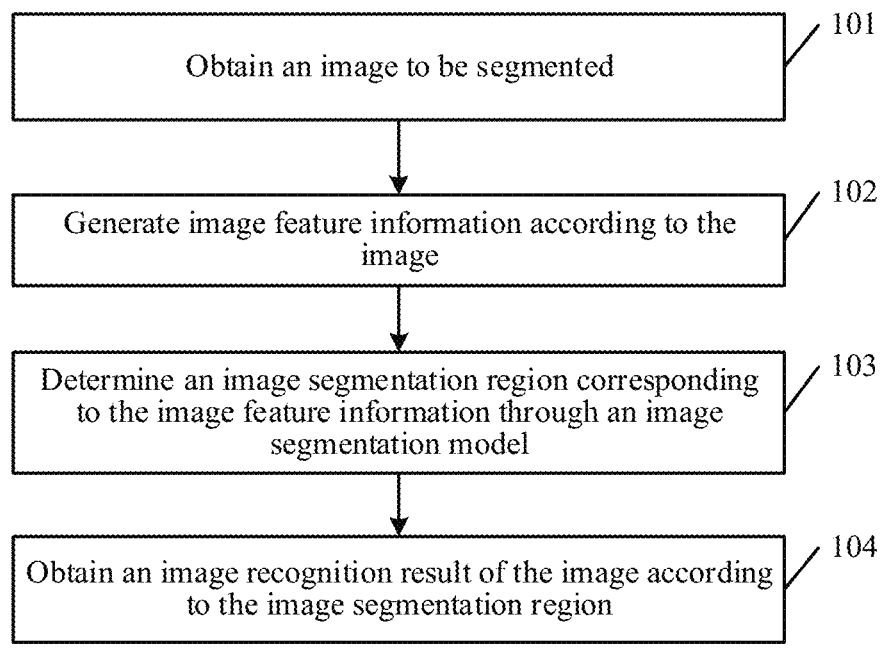
FIG. 3 is a schematic diagram of an embodiment of an image recognition method according to embodiments of the present disclosure.

An image recognition method in the present disclosure is introduced below with reference to the foregoing introduction. Referring to FIG. 3, an embodiment of the image recognition method in the embodiments of the present disclosure includes the following steps:

101. Obtain an image to be segmented. The to-be-segmented image includes a plurality of extremum points.

In this embodiment, an image recognition device obtains a to-be-segmented image. The image recognition device may be represented as an auxiliary segmentation tool deployed therein, the to-be-segmented image may be obtained through annotation by the auxiliary segmentation tool, a user annotates a plurality of extremum points by using the auxiliary segmentation tool, and the to-be-segmented image is generated according to the extremum points. It may be understood that the image recognition device provided in the present disclosure may be a terminal device or a server.

Specifically, the plurality of extremum points may be the highest point, the lowest point, the leftmost point, and the rightmost point of a target object in the to-be-segmented image.

102. Generate image feature information according to the image. The image feature information includes N image matrices and a heat map, the heat map is generated according to the plurality of extremum points, and N is an integer greater than or equal to 1.

In this embodiment, an image segmentation apparatus generates N image matrices according to the to-be-segmented image, and generates a heat map according to the plurality of extremum points, and the heat map is combined with the N image matrices, to obtain the image feature information corresponding to the to-be-segmented image.

Digital image data may be represented by a matrix. If a size of a read to-be-segmented image is 128*128, a size of image matrices is 128*128*N, where N is an integer greater than or equal to 1. When N is 1, the image matrix may be a matrix corresponding to a grayscale image. When N is 3, the image matrices may be matrices of a red, green, and blue (RGB) image. The RGB image is three-dimensional. Three dimensions respectively represent three components of red, green, and blue that are on a scale of 0 to 255, and each pixel is formed by combining the three components. Each RGB channel corresponds to an image matrix (that is, a first image matrix, and a second image matrix, and a third image matrix). Therefore, the three RGB channels are superimposed to form a color image, that is, the to-be-segmented image is obtained. When N is 4, the image matrices may be a color space of red, green, blue, and Alpha (RGBA). Portable network graphics (PNGs) also have four image matrices. The number of N is not limited herein.

103. Determine an image segmentation region corresponding to the image feature information through an image segmentation model. The image segmentation model includes N matrix input channels and a heat map input channel, the N matrix input channels have a one-to-one correspondence with the N image matrices, and the heat map input channel has a correspondence with the heat map. It may be understood that the correspondence mentioned herein refers to that if an image matrix a has a correspondence with a matrix input channel a, when the image segmentation region corresponding to the image feature information is obtained through the image segmentation model, the image matrix a is inputted to the image segmentation model from the matrix input channel a. This input manner also applies to the heat map and the heat map input channels.

In this embodiment, the image segmentation apparatus inputs the image feature information to the image segmentation model. The image segmentation model may use a deep lab structure, including, but not limited to, DeepLabV1, DeepLabV2, DeepLabV3, and DeepLabV3+. The DeepLabV2 structure is a CNN model structure for image segmentation. An image is inputted, and a mask image of the same size as the original image is outputted. A value of each pixel in the image represents a type label value to which the pixel pertains. The DeepLabV3+ structure is an improved CNN model structure for image segmentation based on DeeplabV2. DeepLabV3+ usually achieves a better result in an image segmentation competition. The CNN is a development of neural network models, replaces a fully connected layer structure in an artificial neural network with a convolutional layer, and achieves very excellent performance in various fields of computer vision.

In the present disclosure, the structure of the image segmentation model needs to be improved, and first layer parameters of the image segmentation model need to be modified, so that the image segmentation model can receive (N+1) channels of image data, that is, the image segmentation model includes N matrix input channels and a heat map input channel. Assuming that N is 3, there are three image matrices corresponding to three matrix input channels, each matrix input channel corresponds to an image matrix, there is also a heat map input channel, and the heat map input channel corresponds to a heat map.

Similarly, assuming that N is 1, there are one image matrix corresponding to one matrix input channel, one matrix input channel corresponds to an image matrix of a grayscale image, there is also a heat map input channel, and the heat map input channel corresponds to a heat map.

Similarly, assuming that N is 4, there are four image matrices corresponding to four matrix input channels, each matrix input channel corresponds to an image matrix, there is also a heat map input channel, and the heat map input channel corresponds to a heat map.

104. Generate an image recognition result of the to-be-segmented image according to the image segmentation region.

In this embodiment, the image segmentation apparatus generates the image recognition result of the to-be-segmented image according to the image segmentation region. Specifically, the image segmentation region is a mask image, an edge of the target object in the to-be-segmented image may be obtained based on the mask image, and a user may manually adjust the edge of the image segmentation region, to finally obtain the image recognition result. The image recognition result may be displayed through text information, for example, the image recognition result is an object such as "monkey" or "car". The image recognition result may also be to prominently display the target object in the to-be-segmented image. The target object may be an object such as "car" or "monkey".

In an embodiment of the present disclosure, an image recognition method is provided. First, a to-be-segmented image is obtained, the to-be-segmented image including a plurality of extremum points. Next, image feature information is generated according to the to-be-segmented image, the image feature information including a first image matrix, a second image matrix, a third image matrix, and a heat map, and the heat map being generated according to the plurality of extremum points. Finally, an image segmentation region corresponding to the image feature information may be obtained through an image segmentation model, the image segmentation model including a first input channel, a second input channel, a third input channel, and a fourth input channel, the first input channel having a correspondence with the first image matrix, the second input channel having a correspondence with the second image matrix, the third input channel having a correspondence with the third image matrix, and the fourth input channel having a correspondence with the heat map. By using the foregoing method, there is no need to consider whether a target meets a specific type, and a heat map generated by using extremum points is used as part of image feature information to enrich feature contents of an image, so that an image segmentation model can generate a more accurate image segmentation region according to the image feature information, thereby enhancing the versatility and applicability of image segmentation, and therefore the segmentation result can provide accurate data for the image recognition of the target object, further improving the accuracy of image recognition.

Figure 4:
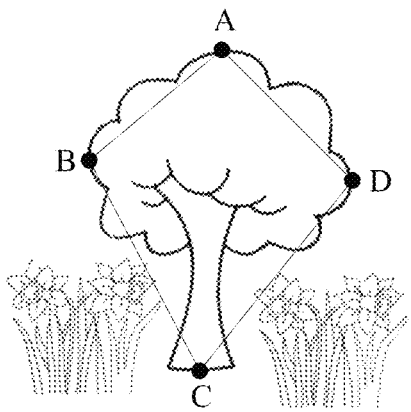
FIG. 4 is a schematic diagram of an embodiment of selecting four extremum points according to embodiments of the present disclosure.

In some embodiments, based on FIG. 3 and the embodiment corresponding to FIG. 3, in one embodiments of the image recognition method provided in the embodiments of the present disclosure, the obtaining an image to be segmented may include:

receiving an object annotation instruction for a to-be-processed image, the to-be-processed image including a target object, the object annotation instruction carrying location information of a plurality of extremum points corresponding to the target object, and the plurality of extremum points being used for identifying a contour edge of the target object, where to identify the target object, the extremum points may be determined based on a periphery of the contour edge of the target object, for example, extremum points in four directions of up, down, left, and right, as shown in FIG. 4, and in this case, the plurality of extremum points may include four extremum points, and correspondingly, the location information of the four extremum points includes first extremum point location information, second extremum point location information, third extremum point location information, and fourth extremum point location information; and generating a to-be-segmented image according to the to-be-processed image in response to the object annotation instruction.

In this embodiment, a manner for annotation based on extremum points is introduced, and a user may annotate a plurality of extremum points by using an auxiliary segmentation tool. For ease of understanding, refer to FIG. 4. FIG. 4 is a schematic diagram of an embodiment of selecting four extremum points according to embodiments of the present disclosure. As shown in the figure, a to-be-processed image is first displayed, and the to-be-processed image includes a target object, for example, including flowers, grasses, and a tree. In actual application, the target object includes, but is not limited to, a person, an animal, a car, and another object. After starting an auxiliary segmentation tool, a user may trigger an object annotation instruction. For example, a plurality of extremum points are selected from the to-be-processed image by clicking. In FIG. 4, assuming that the target object is the tree, the user selects four extremum points, that is, a first extremum point A, a second extremum point B, a third extremum point C, and a fourth extremum point D, of the tree by using the auxiliary segmentation tool. The object annotation instruction specifically carries coordinate information of the four extremum points, so as to generate a to-be-segmented image corresponding to the to-be-processed image according to the object annotation instruction. The to-be-segmented image is the image corresponding to the tree as shown in FIG. 4, and the to-be-segmented image includes a region formed by the first extremum point A, the second extremum point B, the third extremum point C, and the fourth extremum point D.

Figure 5:
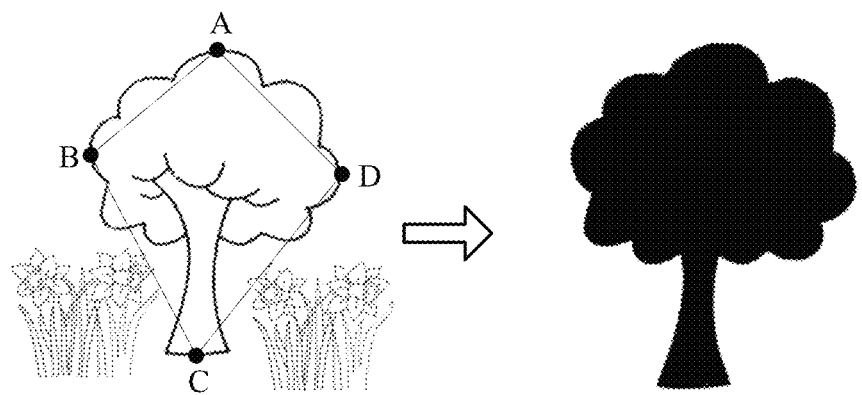
FIG. 5 is a schematic diagram of an embodiment of returning an image segmentation region by an image segmentation model according to embodiments of the present disclosure.

The auxiliary segmentation tool generates image feature information (including a heat map and image matrices) according to the to-be-segmented image, and then determines an image segmentation region corresponding to the image feature information through an image segmentation model. Refer to FIG. 5. FIG. 5 is a schematic diagram of an embodiment of returning an image segmentation region by an image segmentation model according to embodiments of the present disclosure. As shown in the figure, the auxiliary segmentation tool calculates based on the four extremum points to obtain an image segmentation region, and returns the image segmentation region, for example, an image corresponding to a shaded part in FIG. 5 is the image segmentation region. It may be understood that the image segmentation region may be a pre-segmented polygon result. FIG. 5 is only an example, and is not to be understood as a limitation to the present disclosure.

In addition, in this embodiment of the present disclosure, a method for annotating extremum points is provided. First, a to-be-processed image is displayed. Next, an object annotation instruction is received, the object annotation instruction carrying first extremum point location information, second extremum point location information, third extremum point location information, and fourth extremum point location information that correspond to a target object. Finally, a to-be-segmented image is generated according to the to-be-processed image in response to the object annotation instruction. By using the foregoing method, the to-be-processed image can be annotated by using an auxiliary segmentation tool, the operation difficulty is low and the convenience of use is high for the auxiliary segmentation tool, thereby improving the feasibility and operability of the solution.

In some embodiments, based on FIG. 3 and the embodiment corresponding to FIG. 3, in one embodiments of the image recognition method provided in the embodiments of the present disclosure, after the obtaining an image segmentation region corresponding to the image feature information through an image segmentation model, the method may further include:

receiving a first adjustment instruction for a first vertex, the first vertex pertaining to an edge point of the image segmentation region, and the first vertex corresponding to first location information; and scaling down the image segmentation region in response to the first adjustment instruction, to obtain a target segmentation region, the target segmentation region including a second vertex obtained through adjustment based on the first vertex, the second vertex corresponding to second location information, and the second location information being different from the first location information.

Figure 6:
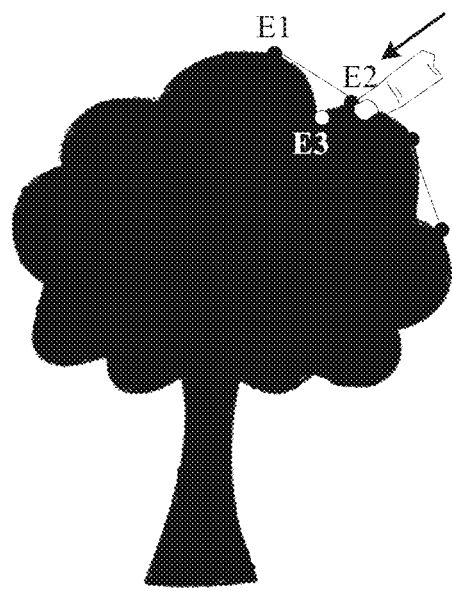
FIG. 6 is a schematic diagram of an embodiment of scaling down an image segmentation region according to embodiments of the present disclosure.

In this embodiment, a method for adjusting the image segmentation region is introduced, and a user may trigger the first adjustment instruction by using an auxiliary segmentation tool. For ease of understanding, refer to FIG. 6. FIG. 6 is a schematic diagram of an embodiment of scaling down an image segmentation region according to embodiments of the present disclosure. As shown in the figure, if there is an error in the pre-segmented image segmentation region, the user may directly modify the image segmentation region. A modification manner includes dragging edges or vertexes of a polygon. For example, the image segmentation region has a vertex E1, a vertex E2, and a vertex E3, and a line segment formed by the vertex E1 and the vertex E2 exceeds the range of a tree. Therefore, the user may trigger the first adjustment instruction, that is, pressing and holding a first vertex (for example, the vertex E2) to drag the first vertex towards a portion inside the target object (for example, the tree), so as to change the location of the first vertex. In response to the first adjustment instruction, the auxiliary segmentation tool scales down the image segmentation region to obtain a target segmentation region. The target segmentation region is the adjusted image segmentation region, and the original location of the first vertex is changed to the location of a second vertex, and the second vertex may be at the location of E3 shown in FIG. 6.

In addition, in this embodiment of the present disclosure, a method for adjusting the image segmentation region is provided, including: receiving a first adjustment instruction, and scaling down an image segmentation region in response to the first adjustment instruction, to obtain a target segmentation region. By using the foregoing method, the user may adjust the image segmentation region by using the auxiliary segmentation tool, so as to obtain a more accurate segmentation result, thereby enhancing the practicability and flexibility of the solution.

In some embodiments, based on FIG. 3 and the embodiment corresponding to FIG. 3, in one embodiments of the image segmentation method provided in the embodiments of the present disclosure, after the obtaining an image segmentation region corresponding to the image feature information through an image segmentation model, the method may further include:

receiving a second adjustment instruction for a third vertex, the third vertex not pertaining to the image segmentation region; and scaling up the image segmentation region in response to the second adjustment instruction, to obtain a target segmentation region, the target segmentation region including a fourth vertex obtained through adjustment based on the third vertex.

Figure 7:
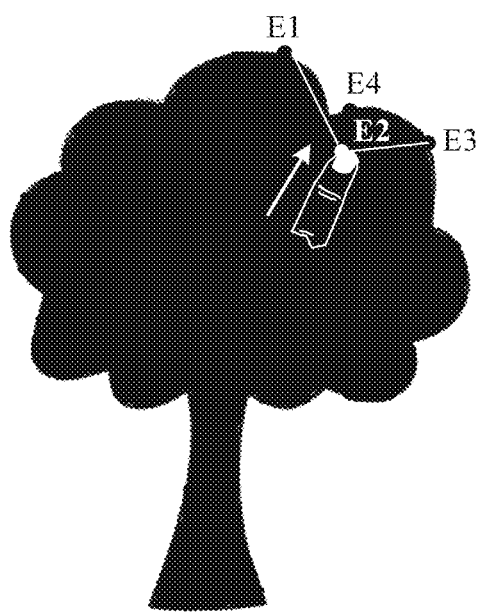
FIG. 7 is a schematic diagram of an embodiment of scaling up an image segmentation region according to embodiments of the present disclosure.

In this embodiment, another method for adjusting the image segmentation region is introduced, and a user may trigger the second adjustment instruction by using an auxiliary segmentation tool. For ease of understanding, refer to FIG. 7. FIG. 7 is a schematic diagram of an embodiment of scaling up an image segmentation region according to embodiments of the present disclosure. As shown in the figure, if there is an error in the pre-segmented image segmentation region, the user may directly modify the image segmentation region. A modification manner includes adding vertexes on edges of a polygon, or drawing a new polygon to cover and merge an error region. For example, the image segmentation region has a vertex E1, a vertex E2, and a vertex E3, and a line segment formed by the vertex E1 and the vertex E2 falls in the range of a tree. Therefore, the user may trigger the second adjustment instruction, that is, pressing and holding a third vertex (for example, the vertex E2) to drag the third vertex towards a portion outside the target object (for example, the tree), so as to change the location of the third vertex. In response to the second adjustment instruction, the auxiliary segmentation tool scales up the image segmentation region to obtain a target segmentation region. The target segmentation region is the adjusted image segmentation region, and the original location of the third vertex is changed to become a new vertex (a fourth vertex) on the target segmentation region, and the fourth vertex may be at the location of E3 shown in FIG. 7.

In addition, in this embodiment of the present disclosure, another method for adjusting the image segmentation region is provided, including: receiving a second adjustment instruction, and scaling up an image segmentation region in response to the second adjustment instruction, to obtain a target segmentation region. By using the foregoing method, the user may adjust the image segmentation region by using the auxiliary segmentation tool, so as to obtain a more accurate segmentation result, thereby enhancing the practicability and flexibility of the solution.

In some embodiments, based on FIG. 3 and the embodiment corresponding to FIG. 3, in one embodiments of the image segmentation method provided in the embodiments of the present disclosure, the N matrix input channels include a red input channel, a green input channel, and a blue input channel, and the generating image feature information according to the to-be-segmented image may include:

generating a heat map according to a plurality of extremum points in the to-be-segmented image; and generating N image matrices according to the to-be-segmented image, the N image matrices including a first image matrix corresponding to the red input channel, a second image matrix corresponding to the green input channel, and a third image matrix corresponding to the blue input channel.

Figure 8:
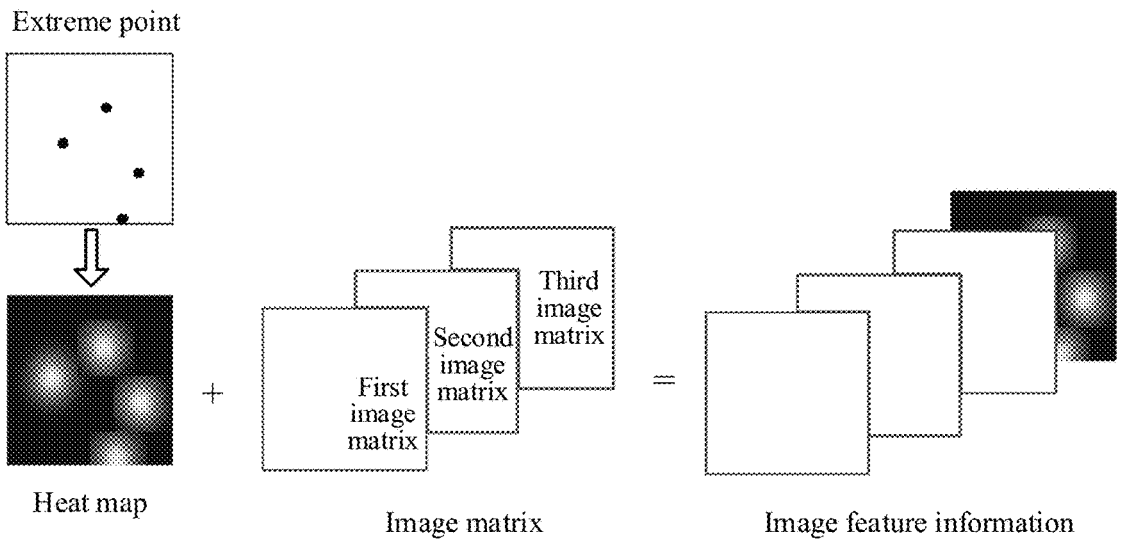
FIG. 8 is a schematic diagram of an embodiment of generating image feature information according to embodiments of the present disclosure.

In this embodiment, using N=3 matrix input channels and one heat map input channel as an example, a method for generating the image feature information is introduced. For ease of understanding, refer to FIG. 8. FIG. 8 is a schematic diagram of an embodiment of generating image feature information according to embodiments of the present disclosure. As shown in the figure, in the present disclosure, a four-channel image matrix is inputted by using an input format of Deep Extreme Cut (DEXTR). That is, in addition to an original image, an input of a model used in the present disclosure also includes information about four extremum points. To make full use of the information about the four extremum points, a heat map with the same size as the to-be-segmented image is generated. As shown in FIG. 8, 2D Gaussian distribution is generated with coordinates of the four extremum points as centers, the heat map is then used as the fourth channel and is merged with other three image matrices to obtain the image feature information, and finally the image feature information is used as an input of an image segmentation model.

The three image matrices are a first image matrix, a second image matrix, and a third image matrix, respectively. The first image matrix corresponds to a red (R) input channel, the second image matrix corresponds to a green (G) input channel, and the third image matrix corresponds to a blue (B) input channel.

Through the heat map, a large amount of data can be collected simply and can be expressed by using a gradual color band, a final effect is generally better than that of direct display of discrete points, and the density or frequency of spatial data can be shown quite intuitively. A principle of heat map generation is mainly divided into four steps, specifically:

(1) Set a radius for a discrete point, and create a buffer.

(2) Fill the buffer of each discrete point by using a gradual grayscale band from inside to outside and from shallow to deep.

(3) Because a gray value can be superimposed, the gray value may be superimposed for a region where the buffers cross. The more the buffers cross, the larger the gray value is, and the "hotter" the region is.

(4) Using the superimposed gray value as an index, color is mapped from a color band with 256 colors, and an image is recolored, to generate a heat map.

It is to be understood that, in an actual application, there are other methods for generating a heat map, for example, four solid circles may be formed directly with each extremum point as a center. The 2D Gaussian distribution is characterized in that a value is larger when closer to a center, and rapidly decreases as far from the center. In the present disclosure, the reason of using a heat map is to give an image segmentation model some priori knowledge during the input of the heat map, so that the image segmentation model learns that these four points are the extremum points selected by the user. However, considering that the extremum points selected by the user are not necessarily true extremum points, and there may be a certain error, so that a heat map distribution is generated with the extremum points as the centers.

In addition, in this embodiment of the present disclosure, a method for generating image feature information according to a to-be-segmented image is provided, including: generating a heat map according to a plurality of extremum points in the to-be-segmented image, generating a first image matrix according to the to-be-segmented image, generating a second image matrix according to the to-be-segmented image, and generating a third image matrix according to the to-be-segmented image. By using the foregoing method, the feasibility and operability of the solution can be effectively improved.

In some embodiments, based on FIG. 3 and the embodiment corresponding to FIG. 3, in one embodiments of the image segmentation method provided in the embodiments of the present disclosure, the obtaining an image segmentation region corresponding to the image feature information through an image segmentation model may include:

encoding the image feature information by an encoder of the image segmentation model, to obtain a first feature map and a second feature map;

concatenating the first feature map and the second feature map, to obtain a target feature map; and decoding the target feature map by a decoder of the image segmentation model, to obtain the image segmentation region.

In this embodiment, a structure of an image segmentation model is introduced. In the present disclosure, a DeeplabV3+ model structure is used as an example for introduction. It may be understood that a DeeplabV2 model structure, U-Net, or a pyramid scene parsing network (PSPNet) may alternatively be used.

Figure 9:
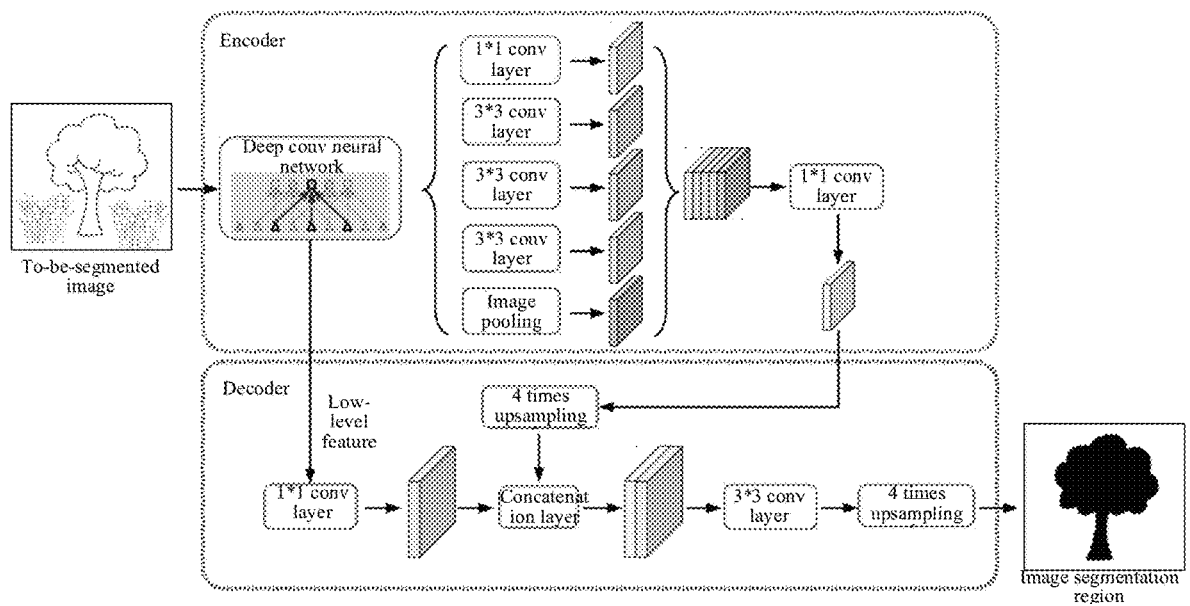
FIG. 9 is a schematic structural diagram of an image segmentation model according to an embodiment of the present disclosure.

For ease of understanding, refer to FIG. 9. FIG. 9 is a schematic structural diagram of an image segmentation model according to an embodiment of the present disclosure. As shown in the figure, features of a to-be-segmented image are extracted to obtain image feature information, and the image feature information is inputted to the image segmentation model. The image segmentation model includes an encoder and a decoder. The encoder is configured to reduce a resolution of a feature map and capture more abstract segmentation information. The decoder is configured to restore spatial information.

First, the image feature information is encoded by a deep convolutional neural network (DCNN) in the encoder, that is, 4 times the resolution is restored through bilinear interpolation to obtain a first feature map. The number of channels is reduced by 1*1 convolution processing, so as to extract low-level features of the image feature information, and then a second feature map can be obtained. The first feature map and the second feature map are concatenated through a concatenation (concat) layer in the decoder of the image segmentation model, to obtain a target feature map. A convolution with a size of 3*3 is concatenated to enhance the target feature map, and then an interpolation is used to further restore the 4 times the resolution to the size of the to-be-segmented image.

An encoding-decoding structure can obtain edge information of an object by gradually restoring spatial information. The DeeplabV3+ model structure adds a decoder based on a DeeplabV3 model structure to enhance segmentation of an edge of an object.

In addition, in this embodiment of the present disclosure, a method for obtaining an image segmentation region through an image segmentation model, including: encoding the image feature information by an encoder of the image segmentation model, to obtain a first feature map and a second feature map, concatenating the first feature map and the second feature map, to obtain a target feature map, and decoding the target feature map by a decoder of the image segmentation model, to obtain the image segmentation region. By using the foregoing method, the image segmentation region is predicted by using a model structure based on a DeeplabV3+ version. The DeeplabV3+ model structure has fewer overall parameters, so that, in both training and actual prediction, the DeeplabV3+ model structure has a high operation speed, and can rapidly respond to an operation of a user when applied to an auxiliary segmentation tool, thereby improving use efficiency, and enhancing user viscosity.

In some embodiments, based on FIG. 3 and the embodiment corresponding to FIG. 3, in one embodiments of the image recognition method provided in the embodiments of the present disclosure, the decoding the target feature map by a decoder of the image segmentation model, to obtain the image segmentation region may include:

decoding the target feature map by the decoder of the image segmentation model, to obtain a first pixel set and a second pixel set, the first pixel set including a plurality of first pixels, and the second pixel set including second pixels; and generating the image segmentation region according to the first pixel set and the second pixel set.

In this embodiment, a method for generating the image segmentation region based on the image segmentation model is introduced. After the target feature map is decoded in the image segmentation region, the first pixel set and the second pixel set are obtained. The first pixel set pertains to pixels of a target object, for example, the first pixel set may be represented as "1", and the second pixel set pertains to a background, for example, the second pixel set may be represented as "0". The first pixel set and the second pixel set jointly form the image segmentation region, that is, a segmentation result of the target object may be seen in the image segmentation region.

A total number of parameters of the DeeplabV3+ model structure is less than that of DeeplabV2, so that, in both training and actual use, the DeeplabV3+ model structure has an operation speed that can be improved, which is reflected on that the DeeplabV3+ model structure can rapidly respond to a request given by a user in real-time use of an auxiliary segmentation tool.

In addition, in this embodiment of the present disclosure, a method for obtaining an image segmentation region through decoding by using an image segmentation model is provided, including: decoding the target feature map by the decoder of the image segmentation model, to obtain a first pixel set and a second pixel set, and generating the image segmentation region according to the first pixel set and the second pixel set. By using the foregoing method, a specific basis is provided for implementation of the solution, and features are decoded based on the structure of an image segmentation model, thereby facilitating improvement of the reliability of image segmentation model application.

In some embodiments, based on FIG. 3 and the embodiment corresponding to FIG. 3, in one embodiments of the image recognition method provided in the embodiments of the present disclosure, after the obtaining an image segmentation region corresponding to the image feature information through an image segmentation model, the method may further include:

processing a to-be-segmented image through a polygonal fitting function, to obtain polygon vertex information, the polygon vertex information including location information of a plurality of vertexes; and determining a target object from the to-be-segmented image according to the polygon vertex information.

Figure 10:
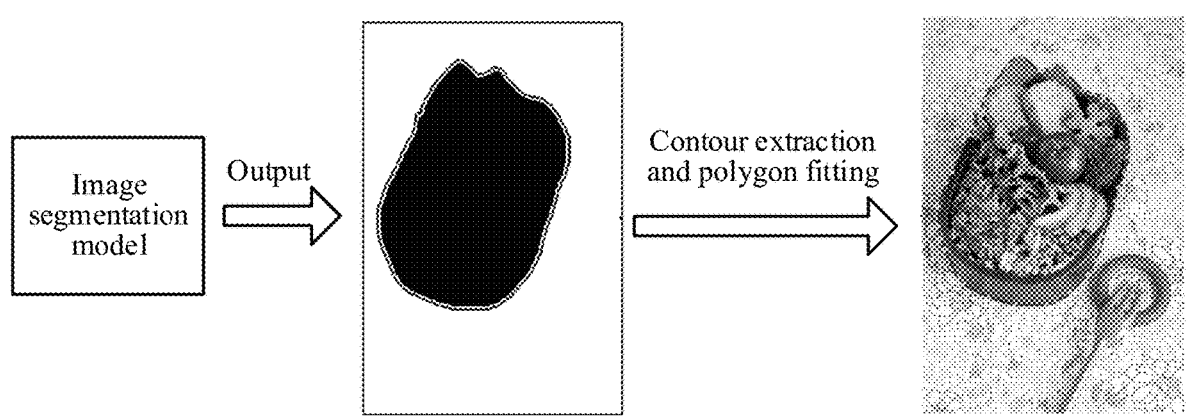
FIG. 10 is a schematic diagram of an embodiment of an output process of an image segmentation model according to embodiments of the present disclosure.

In this embodiment, a method for determining the target object from the to-be-segmented image is introduced. After the image segmentation region is obtained, it is also necessary to perform edge processing on the image segmentation region. Specifically, refer to FIG. 10. FIG. 10 is a schematic diagram of an embodiment of an output process of an image segmentation model according to embodiments of the present disclosure. As shown in figure, the auxiliary segmentation tool provided in the present disclosure is a segmentation tool that does not need to specify a specific object type, and the model can provide a more accurate segmentation result according to four extremum points given by a user for any object on an image. Therefore, in an output layer of the image segmentation model, pixels are not classified according to pre-loaded type numbers, but binary classification is performed on each pixel on the image once, which means whether a current pixel pertains to an inner portion of the object pointed by the extremum points. The image segmentation region outputted by the image segmentation model may be specifically represented as a mask image (the mask image may be understood as a two-dimensional image with a size of an original image, values therein are only 1 and 0, 1 represents that the model is classified as positive, and 0 represents that the model is classified as negative), and the value of each pixel in the image segmentation region is 0 or 1. The value of a pixel is 1, which represents that the image segmentation model determines the pixel as an inner point of the target object. The value of a pixel is 0, which represents that the image segmentation model determines the pixel as a background point. The image segmentation model extracts a contour edge of the target object according to the mask image, performs polygon fitting on the edge of the target object, and finally feeds back polygon vertex information to the auxiliary segmentation tool and annotates the polygon vertex information in the to-be-segmented image. The polygon vertex information includes two-dimensional coordinate information.

The polygonal fitting function used in the present disclosure may be specifically an approxPolyDP function. A main function of the approxPolyDP function is to turn a continuous smooth curve into a polyline to perform polygon fitting on contour points of an image. The approxPolyDP function may be represented as:

void approxPolyDP(InputArray curve, OutputArray approxCurve, double epsilon, bool closed)

InputArray curve represents a point set composed of contour points of an image, OutputArray approxCurve represents an outputted polygon point set, double epsilon represents accuracy of an output, that is, a maximum distance between two contour points, and bool closed represents whether the outputted polygon is closed.

It may be understood that the polygonal fitting function may be other types of functions. This is only an example, and is not to be understood as a limitation to the present disclosure.

Further, in this embodiment of the present disclosure, a method for processing an image segmentation region is provided, including: processing a to-be-segmented image through a polygonal fitting function, to obtain polygon vertex information, the polygon vertex information including location information of a plurality of vertexes, and determining a target object from the to-be-segmented image according to the polygon vertex information. By using the foregoing method, considering that an image may be interfered by various noises, and these noises on the image are usually represented as discrete changes of isolated pixels, so that the to-be-segmented image is processed by using the polygonal fitting function, which can well preserve the edge of the target object and obtain a better image enhancement effect.

Figure 11:
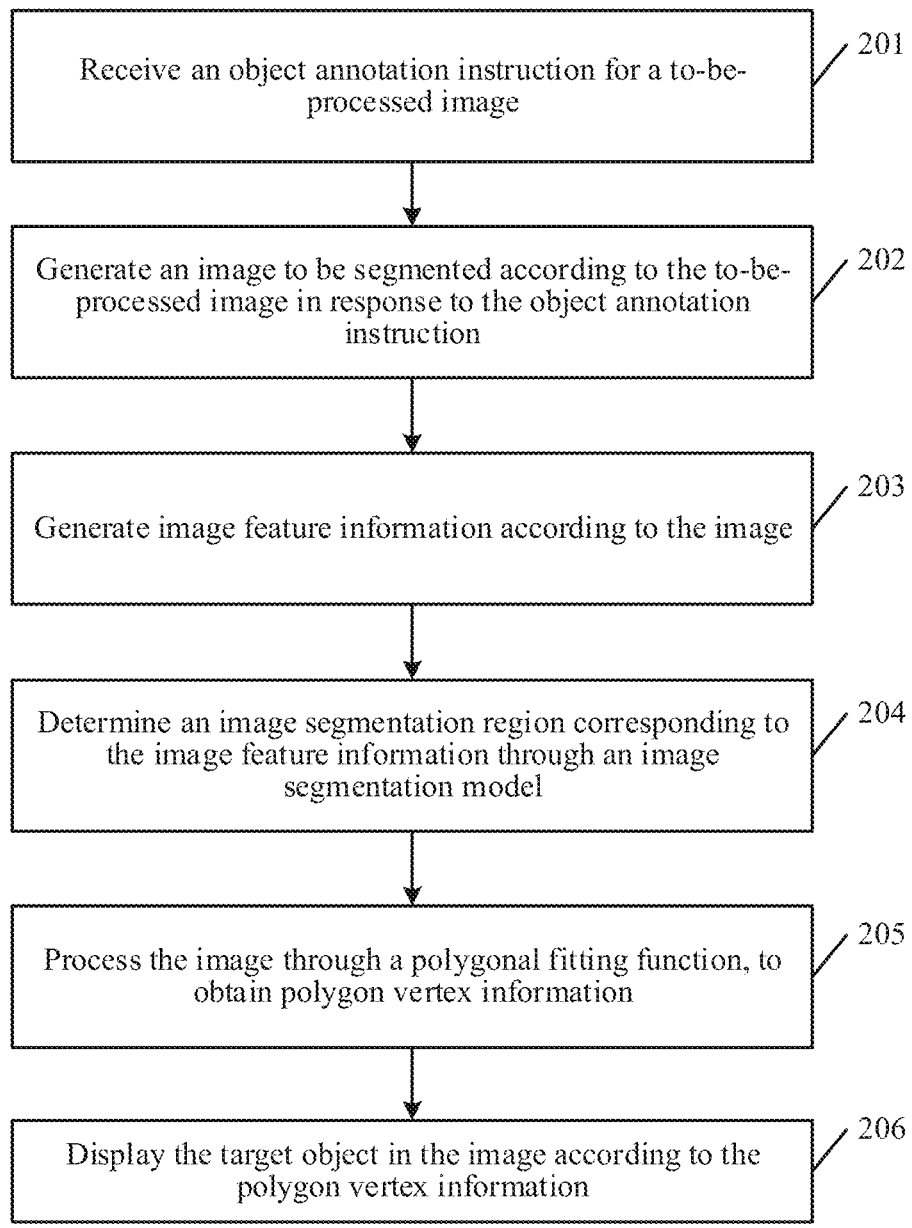
FIG. 11 is a schematic diagram of an embodiment of an image recognition method according to embodiments of the present disclosure.

An image recognition method in the present disclosure is introduced below with reference to the foregoing introduction. Referring to FIG. 11, an embodiment of the image recognition method in the embodiments of the present disclosure includes the following steps:

201. Receive an object annotation instruction for a to-be-processed image. The to-be-processed image includes a target object, and the object annotation instruction carries location information of a plurality of extremum points corresponding to the target object.

The plurality of extremum points may be four as mentioned in the foregoing embodiment, and the corresponding location information includes first extremum point location information, second extremum point location information, third extremum point location information, and fourth extremum point location information.

In this embodiment, an image recognition device displays the to-be-processed image. The to-be-processed image may be represented as an auxiliary segmentation tool, and a user annotates a plurality of extremum points (including a first extremum point, a second extremum point, a third extremum point, and a fourth extremum point) by using the auxiliary segmentation tool, that is, triggering the object annotation instruction. It may be understood that the image recognition device provided in the present disclosure may be a terminal device.

202. Generate an image to be segmented according to the to-be-processed image in response to the object annotation instruction.

In this embodiment, an image recognition apparatus responds to the object annotation instruction, and then may generate the to-be-segmented image according to the extremum points. The to-be-segmented image includes first extremum point location information, second extremum point location information, third extremum point location information, and fourth extremum point location information.

203. Generate image feature information according to the to-be-segmented image. The image feature information includes N image matrices and a heat map, the heat map is generated according to the plurality of extremum points, and N is an integer greater than or equal to 1.

In this embodiment, an image recognition apparatus generates N image matrices according to the to-be-segmented image, and generates a heat map according to the plurality of extremum points, and the heat map is combined with the N image matrices, to obtain the image feature information corresponding to the to-be-segmented image.

Digital image data may be represented by a matrix. If a size of a read to-be-segmented image is 128*128, a size of image matrices is 128*128*N, where N is an integer greater than or equal to 1. When N is 1, the image matrix may be a matrix corresponding to a grayscale image. When N is 3, the image matrices may be matrices of an RGB image. The RGB image is three-dimensional. Three dimensions respectively represent three components of red, green, and blue that are on a scale of 0 to 255, and each pixel is formed by combining the three components. Each RGB channel corresponds to an image matrix (that is, a first image matrix, and a second image matrix, and a third image matrix). Therefore, the three RGB channels are superimposed to form a color image, that is, the to-be-segmented image is obtained. When N is 4, the image matrices may be a color space of RGBA. The PNG also has four image matrices. The number of N is not limited herein.

204. Determine an image segmentation region corresponding to the image feature information through an image segmentation model. The image segmentation model includes N matrix input channels and a heat map input channel, the N matrix input channels have a one-to-one correspondence with the N image matrices, and the heat map input channel has a correspondence with the heat map.

In this embodiment, the image recognition apparatus inputs the image feature information to the image segmentation model. The image segmentation model may use a deep lab structure, including, but not limited to, DeepLabV1, DeepLabV2, DeepLabV3, and DeepLabV3+. In the present disclosure, the structure of the image segmentation model needs to be improved, and first layer parameters of the image segmentation model need to be modified, so that the image segmentation model can receive four channels of image data, that is, the image segmentation model includes a first input channel, a second input channel, a third input channel, and a fourth input channel, the first image matrix is used as input data of the first input channel, the second image matrix is used as input data of the second input channel, the third image matrix is used as input data of the third input channel, and the heat map is used as input data of the fourth input channel.

In the present disclosure, the structure of the image segmentation model needs to be improved, and first layer parameters of the image segmentation model need to be modified, so that the image segmentation model can receive (N+1) channels of image data, that is, the image segmentation model includes N matrix input channels and a heat map input channel. Assuming that N is 3, there are three image matrices corresponding to three matrix input channels, each matrix input channel corresponds to an image matrix, there is also a heat map input channel, and the heat map input channel corresponds to a heat map.

Similarly, assuming that N is 1, there are one image matrix corresponding to one matrix input channel, one matrix input channel corresponds to an image matrix of a grayscale image, there is also a heat map input channel, and the heat map input channel corresponds to a heat map.

Similarly, assuming that N is 4, there are four image matrices corresponding to four matrix input channels, each matrix input channel corresponds to an image matrix, there is also a heat map input channel, and the heat map input channel corresponds to a heat map.

205. Process the to-be-segmented image through a polygonal fitting function, to obtain polygon vertex information. The polygon vertex information includes location information of a plurality of vertexes.

In this embodiment, the image segmentation region outputted by the image recognition apparatus may be specifically represented as a mask image, and the mask image may be understood as a two-dimensional image with a size that is the same as that of the to-be-segmented image, values therein are only 1 and 0, 1 represents that the classification is positive, 0 represents the classification is negative, and the value of each pixel in the image segmentation region is 0 or 1. The value of a pixel is 1, which represents that the image segmentation model determines the pixel as an inner point of the target object. The value of a pixel is 0, which represents that the image segmentation model determines the pixel as a background point. The image recognition apparatus processes the to-be-segmented image by using the polygonal fitting function to obtain the polygon vertex information, and feeds back the polygon vertex information to the auxiliary segmentation tool.

206. Display the target object in the to-be-segmented image according to the polygon vertex information.

In this embodiment, the image recognition apparatus prominently displays the target object in the to-be-segmented image according to the polygon vertex information. Specifically, the image recognition apparatus feeds back the polygon vertex information to the auxiliary segmentation tool and annotates the polygon vertex information in the to-be-segmented image.

In an embodiment of the present disclosure, an image recognition method is provided. When a to-be-processed image is displayed, an object annotation instruction is received, in response to the object annotation instruction, a to-be-segmented image is generated according to the to-be-processed image, image feature information is generated according to the to-be-segmented image, an image segmentation region corresponding to the image feature information is obtained through an image segmentation model, the to-be-segmented image is processed through a polygonal fitting function, to obtain polygon vertex information, and the target object is prominently displayed in the to-be-segmented image according to the polygon vertex information. By using the foregoing method, there is no need to consider whether a target meets a specific type, and a heat map generated by using extremum points is used as part of image feature information to enrich feature contents of an image, so that an image segmentation model can generate a more accurate image segmentation region according to the image feature information, thereby enhancing the versatility and applicability of an auxiliary segmentation tool, and further directly prominently displaying the target object.

Figure 12:
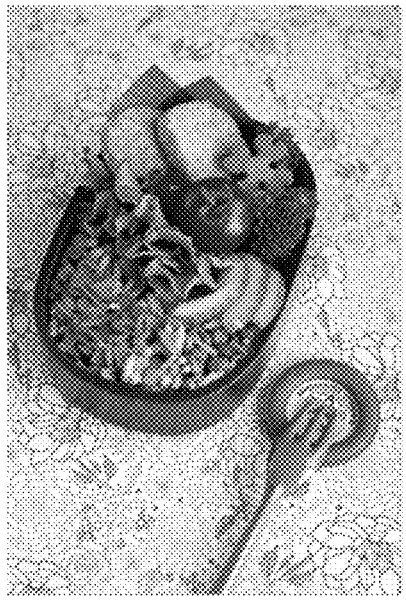
FIG. 12 is a schematic diagram of a comparison of an experimental result based on segmentation manners according to an embodiment of the present disclosure.
Figure 12:
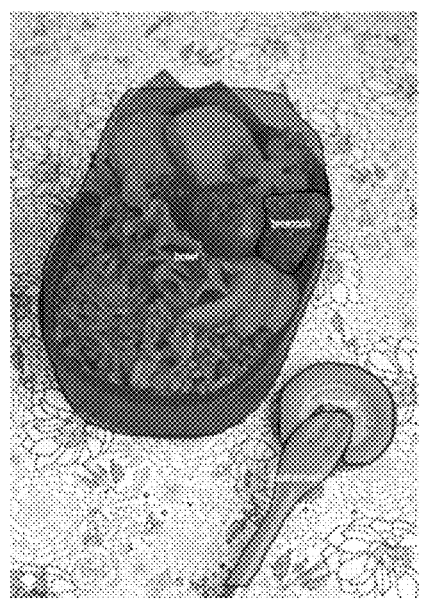
Figure 12:
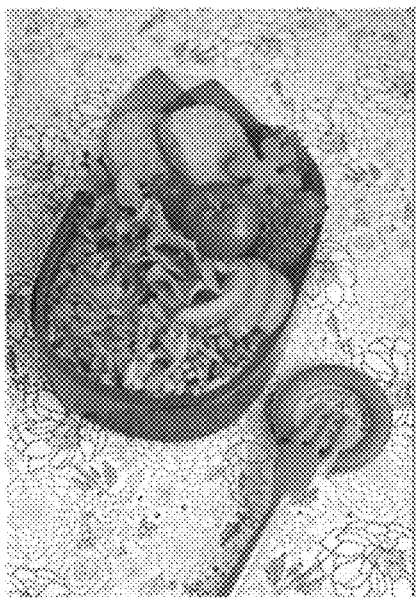
Figure 12:
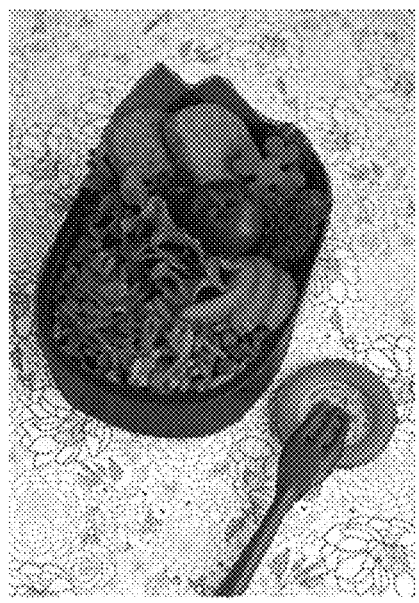

The image segmentation method provided in the present disclosure is described below with reference to experimental data, referring to FIG. 12. FIG. 12 is a schematic diagram of a comparison of an experimental result based on segmentation manners according to an embodiment of the present disclosure. As shown in FIG. 12, (a) shows an original image, (b) shows an image obtained by an auxiliary segmentation tool using Google's fluid annotation, (c) shows an image obtained by an efficient marking Polygon-RNN++ tool using a segmentation dataset, and (d) shows an image annotated by an auxiliary segmentation tool provided in the present disclosure. Compared with the original image, (b), (c), and (d) are covered with one layer separately. This is because a segmentation result combines the original image and a segmented mask, and the segmented mask provides a transparent color and is then superimposed with the original image.

Based on the segmentation result in FIG. 12, it can be seen that the auxiliary segmentation tool provided in the present disclosure can provide a more accurate segmentation result compared with existing auxiliary segmentation tools. In addition, compared with an original segmentation model, the improved image segmentation model of the present disclosure reduces a model response time while ensuring that the segmentation accuracy does not decrease, and improves an interaction efficiency for online auxiliary segmentation tools. Refer to Table 1. Table 1 shows comparison of performance and time between the image segmentation model provided in the present disclosure and an original model.

TABLE 1

| Model | mIOU (Pascal) | mIOU (Pascal + SBD) | Time spent on a single image (Tesla P100) |
|---|---|---|---|
| DEXTR | 87.60% | 91.20% | 1.02 s |
| Image segmentation model | 89.50% | 91.00% | 0.28 s | mIOU represents a mean interaction ratio (mean Intersection Over Union). mIOU is an important indicator for measuring the accuracy of image segmentation. mIOU is an intersection of a predicted region and an actual region divided by a union of the predicted region and the actual region, and an average is taken for all types. Pascal is an image segmentation dataset. A semantic boundaries dataset (SBD) is an image segmentation dataset. Tesla P100 is the model of a graphics card used. Table 1 shows the performance of the image segmentation model provided by the present disclosure and the original DEXTR model after training by using different datasets. The indicator mIOU is used to represent the performance of the models. When training by using only the pascal dataset, the image segmentation model used in the present disclosure can provide a more accurate result on a test dataset. When training by using the pascal+SBD datasets, the performance of the image segmentation model used in the present disclosure and the performance of the original DEXTR model are not much different. Table 1 also shows an average time comparison of the two models running a single image under the same graphics card environment. It can be seen that the image segmentation model used in the present disclosure has a very significant improvement in time performance compared with the original DEXTR model.

Therefore, the auxiliary segmentation tool provided by the present disclosure can provide a more accurate segmentation result in a complex scenario. On the one hand, an accurate pre-segmentation result can be given, and on the other hand, a higher model speed can also be achieved, so that an online auxiliary tool can respond faster.

Figure 13:
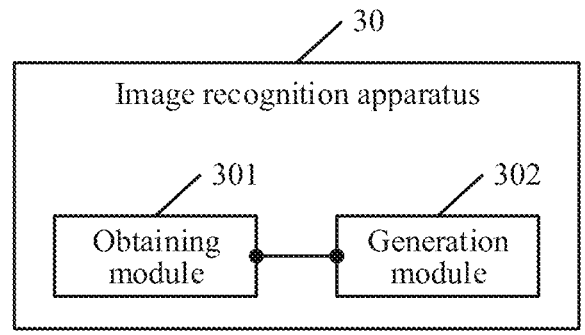
FIG. 13 is a schematic diagram of an embodiment of an image recognition apparatus according to embodiments of the present disclosure.

An image segmentation apparatus in the present disclosure is described below in detail. Referring to FIG. 13, FIG. 13 is a schematic diagram of an embodiment of an image recognition apparatus according to embodiments of the present disclosure. An image recognition apparatus 30 includes:

an obtaining module 301, configured to obtain a to-be-segmented image, the to-be-segmented image including a plurality of extremum points; and a generation module 302, configured to generate image feature information according to the to-be-segmented image obtained by the obtaining module 301, the image feature information including N image matrices and a heat map, the heat map being generated according to the plurality of extremum points, and N being an integer greater than or equal to 1.

The obtaining module 301 is further configured to obtain an image segmentation region corresponding to the image feature information generated by the generation module 302 through an image segmentation model, the image segmentation model including N matrix input channels and a heat map input channel, the N matrix input channels having a one-to-one correspondence with the N image matrices, and the heat map input channel having a correspondence with the heat map.

The generation module 302 is further configured to generate an image recognition result of the to-be-segmented image according to the image segmentation region obtained by the obtaining module 301.

In this embodiment, the obtaining module 301 obtains a to-be-segmented image, the to-be-segmented image including a plurality of extremum points; the generation module 302 generates image feature information according to the to-be-segmented image obtained by the obtaining module 301, the image feature information including N image matrices and a heat map, the heat map being generated according to the plurality of extremum points, and N being an integer greater than or equal to 1; the obtaining module 301 obtains an image segmentation region corresponding to the image feature information generated by the generation module 302 through an image segmentation model, the image segmentation model including N matrix input channels and a heat map input channel, the N matrix input channels having a one-to-one correspondence with the N image matrices, and the heat map input channel having a correspondence with the heat map; and the generation module 302 generates an image recognition result of the to-be-segmented image according to the image segmentation region obtained by the obtaining module 301.

In an embodiment of the present disclosure, an image recognition apparatus is provided. First, a to-be-segmented image is obtained, the to-be-segmented image including a plurality of extremum points. Next, image feature information is generated according to the to-be-segmented image, the image feature information including N image matrices and a heat map, and the heat map being generated according to the plurality of extremum points. Then, an image segmentation region corresponding to the image feature information is obtained through an image segmentation model, the image segmentation model including N matrix input channels and a heat map input channel, the N matrix input channels having a one-to-one correspondence with the N image matrices, and the heat map input channel having a correspondence with the heat map. Finally, an image recognition result of the to-be-segmented image is generated according to the image segmentation region. By using the foregoing method, there is no need to consider whether a target meets a specific type, and a heat map generated by using extremum points is used as part of image feature information to enrich feature contents of an image, so that an image segmentation model can generate a more accurate image segmentation region according to the image feature information, thereby enhancing the versatility and applicability of image segmentation.

In some embodiments, based on the embodiment corresponding to FIG. 13, in another embodiment of the image recognition apparatus 30 provided in the embodiments of the present disclosure, the obtaining module 301 is specifically configured to: display a to-be-processed image, the to-be-processed image including a target object;

receive an object annotation instruction for a to-be-processed image, the to-be-processed image including a target object, the object annotation instruction carrying location information of a plurality of extremum points corresponding to the target object, and the plurality of extremum points being used for identifying a contour edge of the target object; and generate the to-be-segmented image according to the to-be-processed image in response to the object annotation instruction.

In addition, in this embodiment of the present disclosure, a method for annotating extremum points is provided. First, a to-be-processed image is displayed. Next, an object annotation instruction is received, the object annotation instruction carrying first extremum point location information, second extremum point location information, third extremum point location information, and fourth extremum point location information that correspond to a target object. Finally, a to-be-segmented image is generated according to the to-be-processed image in response to the object annotation instruction. By using the foregoing method, the to-be-processed image can be annotated by using an auxiliary segmentation tool, the operation difficulty is low and the convenience of use is high for the auxiliary segmentation tool, thereby improving the feasibility and operability of the solution.

Figure 14:
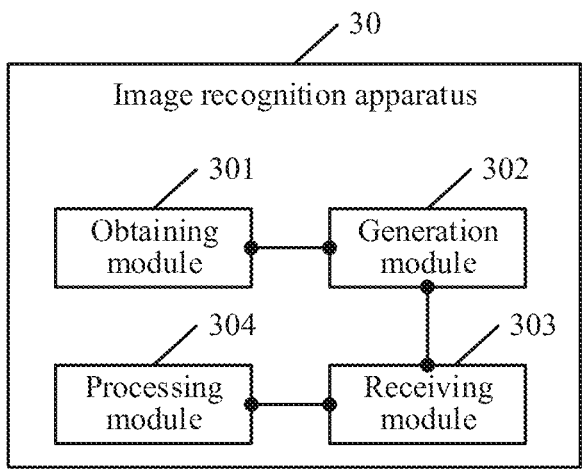
FIG. 14 is a schematic diagram of another embodiment of an image recognition apparatus according to embodiments of the present disclosure.

In some embodiments, based on the embodiment corresponding to FIG. 13, referring to FIG. 14, in another embodiment of the image recognition apparatus 30 provided in the embodiments of the present disclosure, the image recognition apparatus 30 further includes a receiving module 303 and a processing module 304.

The receiving module 303 is configured to receive a first adjustment instruction for a first vertex, the first vertex pertaining to an edge point of the image segmentation region, and the first vertex corresponding to first location information.

The processing module 304 is configured to scale down the image segmentation region in response to the first adjustment instruction received by the receiving module 303, to obtain a target segmentation region, the target segmentation region including a second vertex obtained through adjustment based on the first vertex, the second vertex corresponding to second location information, and the second location information being different from the first location information.

In addition, in this embodiment of the present disclosure, a method for adjusting the image segmentation region is provided, including: receiving a first adjustment instruction, and scaling down an image segmentation region in response to the first adjustment instruction, to obtain a target segmentation region. By using the foregoing method, the user may adjust the image segmentation region by using the auxiliary segmentation tool, so as to obtain a more accurate segmentation result, thereby enhancing the practicability and flexibility of the solution.

In some embodiments, based on the embodiment corresponding to FIG. 14, in another embodiment of the image recognition apparatus 30 provided in the embodiments of the present disclosure, the image recognition apparatus 30 further includes the receiving module 303 and the processing module 304.

The receiving module 303 is further configured to receive a second adjustment instruction for a third vertex, the third vertex pertaining to the image segmentation region.

The processing module 304 is further configured to scale up the image segmentation region in response to the second adjustment instruction received by the receiving module 303, to obtain a target segmentation region, the target segmentation region including a fourth vertex obtained through adjustment based on the third vertex.

In addition, in this embodiment of the present disclosure, another method for adjusting the image segmentation region is provided, including: receiving a second adjustment instruction, and scaling up an image segmentation region in response to the second adjustment instruction, to obtain a target segmentation region. By using the foregoing method, the user may adjust the image segmentation region by using the auxiliary segmentation tool, so as to obtain a more accurate segmentation result, thereby enhancing the practicability and flexibility of the solution.

In some embodiments, based on the embodiment corresponding to FIG. 13 or FIG. 14, the N matrix input channels include a red input channel, a green input channel, and a blue input channel, and in another embodiment of the image recognition apparatus 30 provided in the embodiments of the present disclosure, the generation module 302 is specifically configured to:
  generate the heat map according to the plurality of extremum points in the to-be-segmented image; and
  generate the N image matrices according to the to-be-segmented image, the N image matrices including a first image matrix corresponding to the red input channel, a second image matrix corresponding to the green input channel, and a third image matrix corresponding to the blue input channel.

In addition, in this embodiment of the present disclosure, a method for generating image feature information according to a to-be-segmented image is provided, including: generating a heat map according to a plurality of extremum points in the to-be-segmented image, generating a first image matrix according to the to-be-segmented image, generating a second image matrix according to the to-be-segmented image, and generating a third image matrix according to the to-be-segmented image. By using the foregoing method, the feasibility and operability of the solution can be effectively improved.

In some embodiments, based on the embodiment corresponding to FIG. 13 or FIG. 14, in another embodiment of the image recognition apparatus 30 provided in the embodiments of the present disclosure,
the obtaining module 301 is specifically configured to:
  encode the image feature information by an encoder of the image segmentation model, to obtain a first feature map and a second feature map;
  concatenate the first feature map and the second feature map, to obtain a target feature map; and
  decode the target feature map by a decoder of the image segmentation model, to obtain the image segmentation region.

In addition, in this embodiment of the present disclosure, a method for obtaining an image segmentation region through an image segmentation model, including: encoding the image feature information by an encoder of the image segmentation model, to obtain a first feature map and a second feature map, concatenating the first feature map and the second feature map, to obtain a target feature map, and decoding the target feature map by a decoder of the image segmentation model, to obtain the image segmentation region. By using the foregoing method, the image segmentation region is predicted by using a model structure based on a DeeplabV3+ version. The DeeplabV3+ model structure has fewer overall parameters, so that, in both training and actual prediction, the DeeplabV3+ model structure has a high operation speed, and can rapidly respond to an operation of a user when applied to an auxiliary segmentation tool, thereby improving use efficiency, and enhancing user viscosity.

In some embodiments, based on the embodiment corresponding to FIG. 13 or FIG. 14, in another embodiment of the image recognition apparatus 30 provided in the embodiments of the present disclosure,
the obtaining module 301 is specifically configured to:
  decode the target feature map by the decoder of the image segmentation model, to obtain a first pixel set and a second pixel set, the first pixel set including a plurality of first pixels, and the second pixel set including second pixels; and
  generate the image segmentation region according to the first pixel set and the second pixel set.

In addition, in this embodiment of the present disclosure, a method for obtaining an image segmentation region through decoding by using an image segmentation model is provided, including: decoding the target feature map by the decoder of the image segmentation model, to obtain a first pixel set and a second pixel set, and generating the image segmentation region according to the first pixel set and the second pixel set. By using the foregoing method, a specific basis is provided for implementation of the solution, and features are decoded based on the structure of an image segmentation model, thereby facilitating improvement of the reliability of image segmentation model application.

Figure 15:
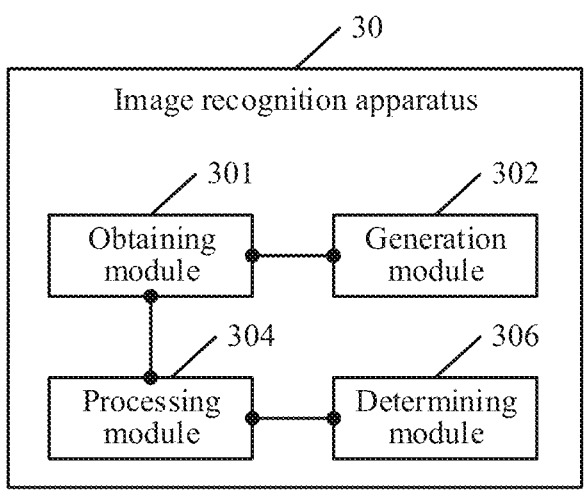
FIG. 15 is a schematic diagram of another embodiment of an image recognition apparatus according to embodiments of the present disclosure.

In some embodiments, based on the embodiment corresponding to FIG. 13 or FIG. 14, referring to FIG. 15, in another embodiment of the image recognition apparatus 30 provided in the embodiments of the present disclosure, the image recognition apparatus further includes the processing module 304 and a determining module 306.

The processing module 304 is further configured to process the to-be-segmented image through a polygonal fitting function, to obtain polygon vertex information, after the obtaining module 301 obtains the image segmentation region corresponding to the image feature information through the image segmentation model, the polygon vertex information including location information of a plurality of vertexes.

The determining module 306 is configured to determine the target object from the to-be-segmented image according to the polygon vertex information obtained through processing by the processing module 304.

Further, in this embodiment of the present disclosure, a method for processing an image segmentation region is provided, including: processing a to-be-segmented image through a polygonal fitting function, to obtain polygon vertex information, the polygon vertex information including location information of a plurality of vertexes, and determining a target object from the to-be-segmented image according to the polygon vertex information. By using the foregoing method, considering that an image may be interfered by various noises, and these noises on the image are usually represented as discrete changes of isolated pixels, so that the to-be-segmented image is processed by using the polygonal fitting function, which can well preserve the edge of the target object and obtain a better image enhancement effect.

Figure 16:
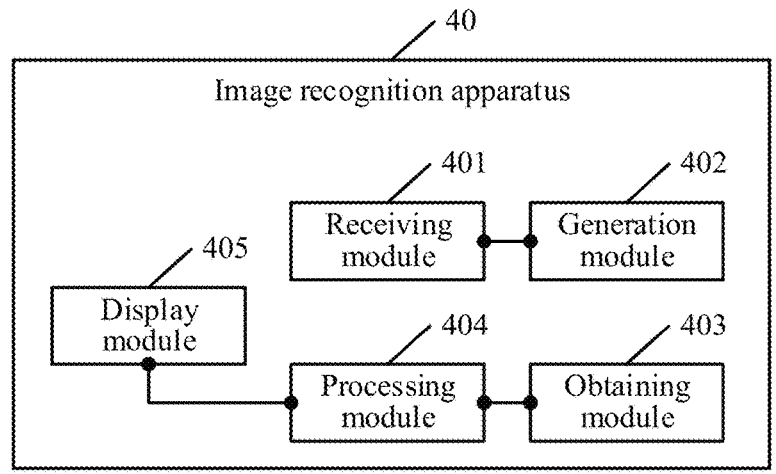
FIG. 16 is a schematic diagram of an embodiment of an image recognition apparatus according to embodiments of the present disclosure.

An image recognition apparatus in the present disclosure is described below in detail. Referring to FIG. 16, FIG. 16 is a schematic diagram of an embodiment of an image recognition apparatus according to embodiments of the present disclosure. An image recognition apparatus 40 includes:
  a receiving module 401, configured to receive an object annotation instruction for a to-be-processed image, the to-be-processed image including a target object, and the object annotation instruction carrying location information of a plurality of extremum points corresponding to the target object;
  a generation module 402, configured to generate a to-be-segmented image according to the to-be-processed image in response to the object annotation instruction received by the receiving module 401;
  the generation module 402 being further configured to generate image feature information according to the to-be-segmented image, the image feature information including N image matrices and a heat map, the heat map being generated according to the plurality of extremum points, and N being an integer greater than or equal to 1;
  an obtaining module 403, configured to obtain an image segmentation region corresponding to the image feature information generated by the generation module 402 through an image segmentation model, the image segmentation model including N matrix input channels and a heat map input channel, the N matrix input channels having a one-to-one correspondence with the N image matrices, and the heat map input channel having a correspondence with the heat map;

a processing module 404, configured to process the to-be-segmented image obtained by the obtaining module 403 through a polygonal fitting function, to obtain polygon vertex information, the polygon vertex information including location information of a plurality of vertexes; and a display module 405, configured to display the target object in the to-be-segmented image according to the polygon vertex information obtained through processing by the processing module 404.

In this embodiment, when a to-be-processed image is displayed, the receiving module 401 receives an object annotation instruction, the object annotation instruction carrying first extremum point location information, second extremum point location information, third extremum point location information, and fourth extremum point location information that correspond to a target object; the generation module 402 generates a to-be-segmented image according to the to-be-processed image in response to the object annotation instruction received by the receiving module 401; the generation module 402 generates image feature information according to the to-be-segmented image, the image feature information including N image matrices and a heat map, the heat map being generated according to the plurality of extremum points, and N being an integer greater than or equal to 1; the obtaining module 403 obtains an image segmentation region corresponding to the image feature information generated by the generation module 402 through an image segmentation model, the image segmentation model including N matrix input channels and a heat map input channel, the N matrix input channels having a one-to-one correspondence with the N image matrices, and the heat map input channel having a correspondence with the heat map; the processing module 404 processes the to-be-segmented image obtained by the obtaining module 403 through a polygonal fitting function, to obtain polygon vertex information, the polygon vertex information including location information of a plurality of vertexes; and the display module 405 prominently displays the target object in the to-be-segmented image according to the polygon vertex information obtained through processing by the processing module 404.

In an embodiment of the present disclosure, an image recognition apparatus is provided. When a to-be-processed image is displayed, an object annotation instruction is received, in response to the object annotation instruction, a to-be-segmented image is generated according to the to-be-processed image, image feature information is generated according to the to-be-segmented image, an image segmentation region corresponding to the image feature information is obtained through an image segmentation model, the to-be-segmented image is processed through a polygonal fitting function, to obtain polygon vertex information, and the target object is prominently displayed in the to-be-segmented image according to the polygon vertex information. By using the foregoing method, there is no need to consider whether a target meets a specific type, and a heat map generated by using extremum points is used as part of image feature information to enrich feature contents of an image, so that an image segmentation model can generate a more accurate image segmentation region according to the image feature information, thereby enhancing the versatility and applicability of an auxiliary segmentation tool, and further directly prominently displaying the target object.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 17:
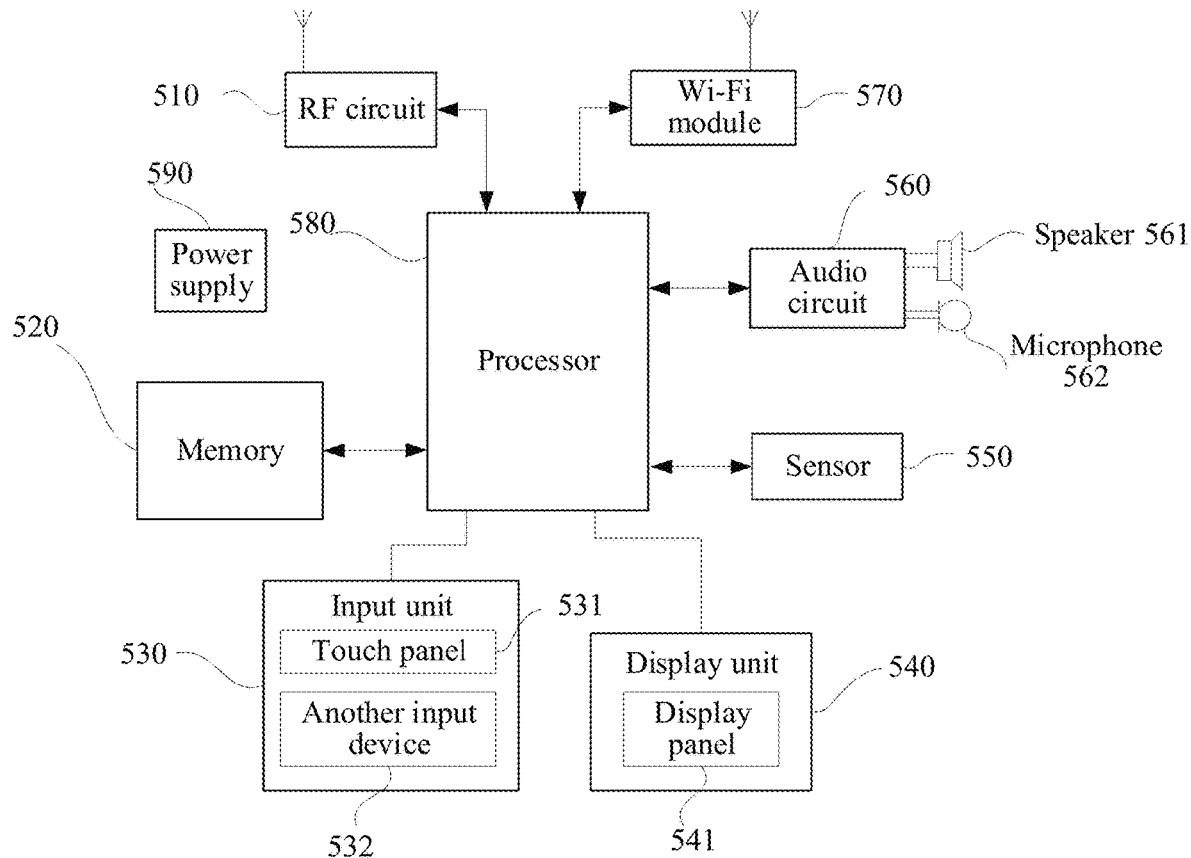
FIG. 17 is a schematic structural diagram of a terminal device according to an embodiment of the present disclosure.

As shown in FIG. 17, an embodiment of the present disclosure further provides another image recognition apparatus. For ease of description, only parts related to this embodiment of the present disclosure are shown. For specific technical details that are not disclosed, refer to the method part of the embodiments of the present disclosure. The terminal device may be any terminal device including a mobile phone, a tablet computer, a PDA, a POS, or an in-vehicle computer. An example in which the terminal device is a mobile phone is used.

FIG. 17 is a block diagram of a partial structure of a mobile phone related to a terminal device according to an embodiment of the present disclosure. Referring to FIG. 17, the mobile phone includes components such as a radio frequency (RF) circuit 510, a memory 520, an input unit 530, a display unit 540, a sensor 550, an audio circuit 560, a wireless fidelity (Wi-Fi) module 570, a processor 580, and a power supply 590. A person skilled in the art may understand that the structure of the mobile phone shown in FIG. 17 does not constitute a limitation to the mobile phone, and the mobile phone may include more components or fewer components than those shown in the figure, or some components may be combined, or a different component deployment may be used.

The following makes a detailed description of the components of the mobile phone with reference to FIG. 17.

The RF circuit 510 may be configured to receive and transmit signals during an information receiving and transmitting process or a call process. Specifically, the RF circuit receives downlink information from a base station, then delivers the downlink information to the processor 580 for processing, and transmits designed uplink data to the base station. Generally, the RF circuit 510 includes, but is not limited to, an antenna, at least one amplifier, a transceiver, a coupler, a low noise amplifier (LNA), and a duplexer. In addition, the RF circuit 510 may also communicate with a network and another device by means of wireless communication. The wireless communication may use any communication standard or protocol, including but not limited to Global System for Mobile Communications (GSM), general packet radio service (GPRS), code division multiple access (CDMA), wideband code division multiple access (WCDMA), long term evolution (LTE), email, short messaging service (SMS), and the like.

The memory 520 may be configured to store a software program and a module. The processor 580 runs the software program and the module that are stored in the memory 520, to implement various functional applications and data processing of the mobile phone. The memory 520 may mainly include a program storage region and a data storage region. The program storage region may store an operating system, an application program required by at least one function (for example, a sound play function and an image display function), and the like. The data storage region may store data (for example, audio data and an address book) created according to the use of the mobile phone, and the like. In addition, the memory 520 may include a high-speed random access memory, and may also include a non-volatile memory, for example, at least one magnetic disk storage device, a flash memory, or another volatile solid-state storage device.

The input unit 530 may be configured to receive inputted digit or character information, and generate a keyboard signal input related to the user setting and function control of the mobile phone. Specifically, the input unit 530 may include a touch panel 531 and another input device 532. The touch panel 531, which may also be referred to as a touch screen, may collect a touch operation of a user on or near the touch panel (for example, an operation of a user on or near the touch panel 531 by using any suitable object or accessory such as a finger or a stylus), and drive a corresponding connection apparatus according to a preset program. In some embodiments, the touch panel 531 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and transmits the touch point coordinates to the processor 580. Moreover, the touch controller can receive and execute a command sent from the processor 580. In addition, the touch panel 531 may be a resistive, capacitive, infrared, or surface acoustic touch panel. Besides the touch panel 531, the input unit 530 may further include another input device 532. Specifically, the another input device 532 may include, but not limited to, one or more of a physical keyboard, a functional key (such as a volume control key or a switch key), a track ball, a mouse, and a joystick.

The display unit 540 may be configured to display information inputted by the user or information provided for the user, and various menus of the mobile phone. The display unit 540 may include a display panel 541. In some embodiments, the display panel 541 may be configured in the form of a liquid crystal display (LCD), an organic light-emitting diode (OLED), or the like. Further, the touch panel 531 may cover the display panel 541. After detecting a touch operation on or near the touch panel 531, the touch panel 531 transfers the touch operation to the processor 580, so as to determine a type of the touch event. Then, the processor 580 provides corresponding visual output on the display panel 541 according to the type of the touch event. Although in FIG. 17, the touch panel 531 and the display panel 541 are used as two separate parts to implement input and output functions of the mobile phone, in some embodiments, the touch panel 531 and the display panel 541 may be integrated to implement the input and output functions of the mobile phone.

The mobile phone may further include at least one sensor 550 such as an optical sensor, a motion sensor, and other sensors. Specifically, the optical sensor may include an ambient light sensor and a proximity sensor. The ambient light sensor may adjust luminance of the display panel 541 according to brightness of the ambient light. The proximity sensor may switch off the display panel 541 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 560, a speaker 561, and a microphone 562 may provide audio interfaces between the user and the mobile phone. The audio circuit 560 may convert received audio data into an electrical signal and transmit the electrical signal to the speaker 561. The speaker 561 converts the electrical signal into a sound signal for output. On the other hand, the microphone 562 converts a collected sound signal into an electrical signal. The audio circuit 560 receives the electrical signal, converts the electrical signal into audio data, and outputs the audio data to the processor 580 for processing. Then, the processor transmits the audio data to, for example, another mobile phone by using the RF circuit 510, or outputs the audio data to the memory 520 for further processing.

Wi-Fi is a short distance wireless transmission technology. The mobile phone may help, by using the Wi-Fi module 570, a user to receive and transmit an email, browse a web page, access stream media, and the like. This provides wireless broadband Internet access for the user. Although FIG. 17 shows the Wi-Fi module 570, it may be understood that the Wi-Fi module is not a necessary component of the mobile phone, and when required, the Wi-Fi module may be omitted as long as the scope of the essence of the present disclosure is not changed.

The processor 580 is the control center of the mobile phone, and is connected to various parts of the mobile phone by using various interfaces and lines. By running or executing the software program and/or module stored in the memory 520, and calling data stored in the memory 520, the processor 580 performs various functions and data processing of the mobile phone, thereby performing overall monitoring on the mobile phone. In some embodiments, the processor 580 may include one or more processing units. In some embodiments, the processor 580 may integrate an application processor and a modem processor. The application processor mainly processes an operating system, a user interface, an application program, and the like. The modem processor mainly processes wireless communication. It may be understood that the foregoing modem processor may either not be integrated into the processor 580.

The mobile phone further includes the power supply 590 (such as a battery) for supplying power to the components. In some embodiments, the power supply may be logically connected to the processor 580 by using a power management system, thereby implementing functions such as charging, discharging, and power consumption management by using the power management system.

Although not shown in the figure, the mobile phone may further include a camera, a Bluetooth module, and the like, which are not described herein again.

In this embodiment of the present disclosure, the processor 580 included in the terminal device further has the following functions:

obtaining an image to be segmented, the to-be-segmented image including a plurality of extremum points;
  generating image feature information according to the to-be-segmented image, the image feature information including N image matrices and a heat map, the heat map being generated according to the plurality of extremum points, and N being an integer greater than or equal to 1;

obtaining an image segmentation region corresponding to the image feature information through an image segmentation model, the image segmentation model including N matrix input channels and a heat map input channel, the N matrix input channels having a one-to-one correspondence with the N image matrices, and the heat map input channel having a correspondence with the heat map; and generating an image recognition result of the to-be-segmented image according to the image segmentation region.

In some embodiments, the processor 580 is specifically configured to perform the following steps:

receiving an object annotation instruction for a to-be-processed image, the to-be-processed image including a target object, the object annotation instruction carrying location information of a plurality of extremum points corresponding to the target object, and the plurality of extremum points being used for identifying a contour edge of the target object; and generating the to-be-segmented image according to the to-be-processed image in response to the object annotation instruction.

In some embodiments, the location information of the plurality of extremum points includes first extremum point location information, second extremum point location information, third extremum point location information, and fourth extremum point location information that separately identify a periphery of the contour edge of the target object.

In some embodiments, the processor 580 is further configured to perform the following steps:

receiving a first adjustment instruction for a first vertex, the first vertex pertaining to an edge point of the image segmentation region, and the first vertex corresponding to first location information; and scaling down the image segmentation region in response to the first adjustment instruction, to obtain a target segmentation region, the target segmentation region including a second vertex obtained through adjustment based on the first vertex, the second vertex corresponding to second location information, and the second location information being different from the first location information.

In some embodiments, the processor 580 is further configured to perform the following steps:

receiving a second adjustment instruction for a third vertex, the third vertex pertaining to the image segmentation region; and scaling up the image segmentation region in response to the second adjustment instruction, to obtain a target segmentation region, the target segmentation region including a fourth vertex obtained through adjustment based on the third vertex.

In some embodiments, the N matrix input channels include a red input channel, a green input channel, and a blue input channel, and the processor 580 is specifically configured to perform the following steps:

generating the heat map according to the plurality of extremum points in the to-be-segmented image; and generating the N image matrices according to the to-be-segmented image, the N image matrices including a first image matrix corresponding to the red input channel, a second image matrix corresponding to the green input channel, and a third image matrix corresponding to the blue input channel.

In some embodiments, the processor 580 is specifically configured to perform the following steps:

encoding the image feature information by an encoder of the image segmentation model, to obtain a first feature map and a second feature map;

concatenating the first feature map and the second feature map, to obtain a target feature map; and decoding the target feature map by a decoder of the image segmentation model, to obtain the image segmentation region.

In some embodiments, the processor 580 is specifically configured to perform the following steps:

decoding the target feature map by the decoder of the image segmentation model, to obtain a first pixel set and a second pixel set, the first pixel set including a plurality of first pixels, and the second pixel set including second pixels; and generating the image segmentation region according to the first pixel set and the second pixel set.

In some embodiments, the processor 580 is further configured to perform the following steps:

processing the to-be-segmented image through a polygonal fitting function, to obtain polygon vertex information, the polygon vertex information including location information of a plurality of vertexes; and determining a target object from the to-be-segmented image according to the polygon vertex information.

In this embodiment of the present disclosure, the processor 580 included in the terminal device further has the following functions:

receiving an object annotation instruction for a to-be-processed image, the to-be-processed image including a target object, and the object annotation instruction carrying location information of a plurality of extremum points corresponding to the target object;

generating a to-be-segmented image according to the to-be-processed image in response to the object annotation instruction;

generating image feature information according to the to-be-segmented image, the image feature information including N image matrices and a heat map, the heat map being generated according to the plurality of extremum points, and N being an integer greater than or equal to 1;

obtaining an image segmentation region corresponding to the image feature information through an image segmentation model, the image segmentation model including N matrix input channels and a heat map input channel, the N matrix input channels having a one-to-one correspondence with the N image matrices, and the heat map input channel having a correspondence with the heat map;

processing the to-be-segmented image through a polygonal fitting function, to obtain polygon vertex information, the polygon vertex information including location information of a plurality of vertexes; and displaying the target object in the to-be-segmented image according to the polygon vertex information.

Figure 18:
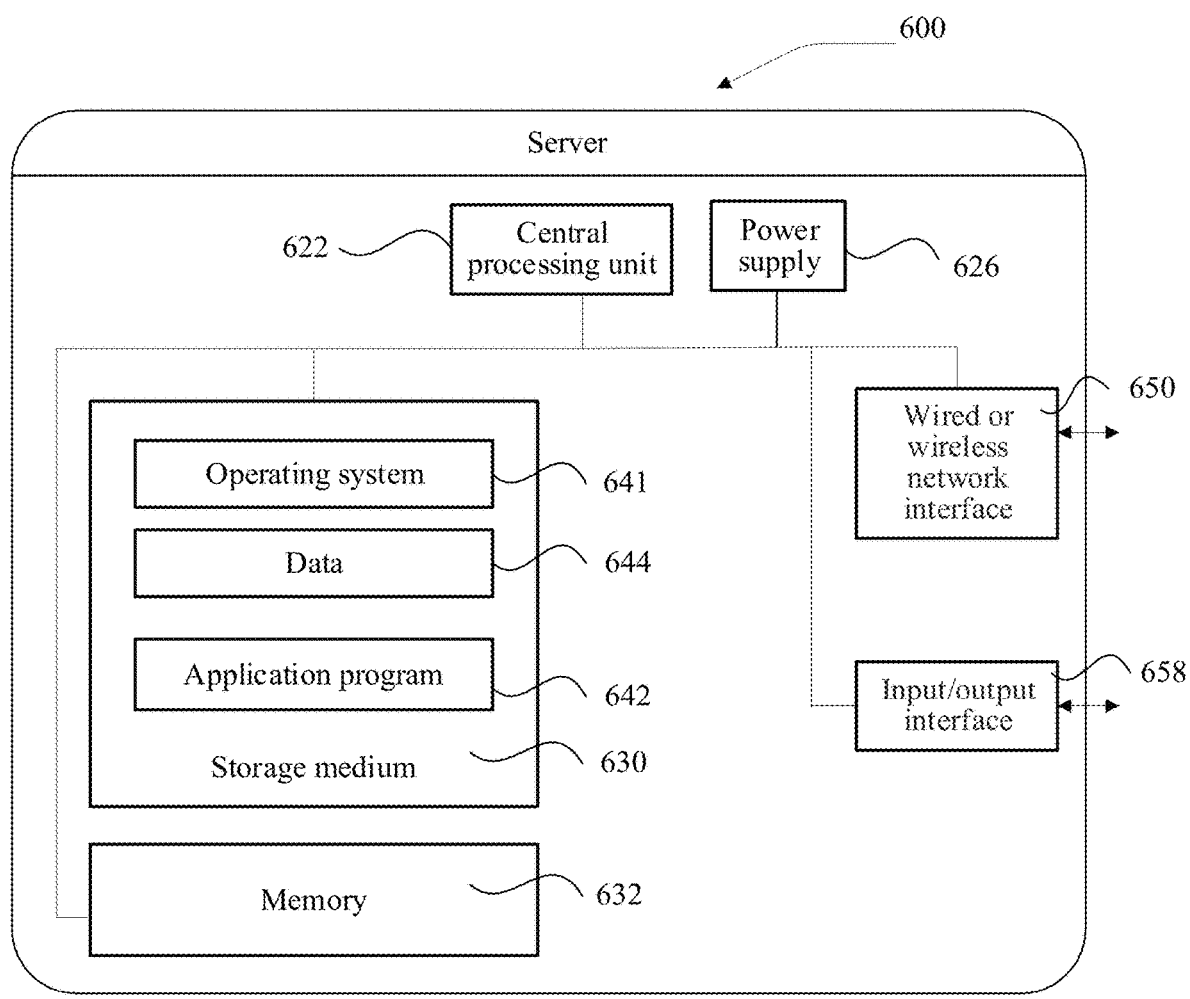
FIG. 18 is a schematic structural diagram of a server according to an embodiment of the present disclosure.

FIG. 18 is a schematic structural diagram of a server according to an embodiment of the present disclosure. A server 600 may vary greatly due to different configurations or performance, and may include one or more central processing units (CPUs) 622 (for example, one or more processors) and a memory 632, and one or more storage media 630 (for example, one or more mass storage devices) that store application programs 642 or data 644. The memory 632 and the storage medium 630 may be temporary storage or persistent storage. The program stored in the storage medium 630 may include one or more modules (not shown), and each module may include a series of instruction operations for the server. Further, the CPU 622 may be configured to communicate with the storage medium 630, and perform, on the server 600, a series of instruction operations in the storage medium 630.

The server 600 may further include one or more power supplies 626, one or more wired or wireless network interfaces 650, one or more input/output interfaces 658, and/or one or more operating systems 641, such as Windows Server™, Mac OS X™, Unix™, Linux™, and FreeBSD™.

The steps performed by the server in the foregoing embodiments may be based on the server structure shown in FIG. 18.

In this embodiment of the present disclosure, the CPU 622 included in the server further has the following functions:

- obtaining an image to be segmented, the to-be-segmented image including a plurality of extremum points;
- generating image feature information according to the to-be-segmented image, the image feature information including N image matrices and a heat map, the heat map being generated according to the plurality of extremum points, and N being an integer greater than or equal to 1;
- obtaining an image segmentation region corresponding to the image feature information through an image segmentation model, the image segmentation model including N matrix input channels and a heat map input channel, the N matrix input channels having a one-to-one correspondence with the N image matrices, and the heat map input channel having a correspondence with the heat map; and
- generating an image recognition result of the to-be-segmented image according to the image segmentation region.

In some embodiments, the CPU 622 is specifically configured to perform the following steps:

- receiving an object annotation instruction for a to-be-processed image, the to-be-processed image including a target object, and the object annotation instruction carrying location information of a plurality of extremum points corresponding to the target object; and
- generating the to-be-segmented image according to the to-be-processed image in response to the object annotation instruction.

In some embodiments, the CPU 622 is further configured to perform the following steps:

- receiving a first adjustment instruction for a first vertex, the first vertex pertaining to an edge point of the image segmentation region, and the first vertex corresponding to first location information; and
- scaling down the image segmentation region in response to the first adjustment instruction, to obtain a target segmentation region, the target segmentation region including a second vertex obtained through adjustment based on the first vertex, the second vertex corresponding to second location information, and the second location information being different from the first location information.

In some embodiments, the CPU 622 is further configured to perform the following steps:

- receiving a second adjustment instruction for a third vertex, the third vertex pertaining to the image segmentation region; and
- scaling up the image segmentation region in response to the second adjustment instruction, to obtain a target segmentation region, the target segmentation region including a fourth vertex obtained through adjustment based on the third vertex.

In some embodiments, the N matrix input channels include a red input channel, a green input channel, and a blue input channel, and the CPU 622 is specifically configured to perform the following steps:

- generating the heat map according to the plurality of extremum points in the to-be-segmented image; and
- generating the N image matrices according to the to-be-segmented image, the N image matrices including a first image matrix corresponding to the red input channel, a second image matrix corresponding to the green input channel, and a third image matrix corresponding to the blue input channel.

In some embodiments, the CPU 622 is specifically configured to perform the following steps:

- encoding the image feature information by an encoder of the image segmentation model, to obtain a first feature map and a second feature map;
- concatenating the first feature map and the second feature map, to obtain a target feature map; and
- decoding the target feature map by a decoder of the image segmentation model, to obtain the image segmentation region.

In some embodiments, the CPU 622 is specifically configured to perform the following steps:

- decoding the target feature map by the decoder of the image segmentation model, to obtain a first pixel set and a second pixel set, the first pixel set including a plurality of first pixels, and the second pixel set including second pixels; and
- generating the image segmentation region according to the first pixel set and the second pixel set.

In some embodiments, the CPU 622 is further configured to perform the following steps:

- processing the to-be-segmented image through a polygonal fitting function, to obtain polygon vertex information, the polygon vertex information including location information of a plurality of vertexes; and
- determining a target object from the to-be-segmented image according to the polygon vertex information.

In this embodiment of the present disclosure, the CPU 622 included in the terminal device further has the following functions:

- receiving an object annotation instruction for a to-be-processed image, the to-be-processed image including a target object, and the object annotation instruction carrying location information of a plurality of extremum points corresponding to the target object;
- generating a to-be-segmented image according to the to-be-processed image in response to the object annotation instruction;
- generating image feature information according to the to-be-segmented image, the image feature information including N image matrices and a heat map, the heat map being generated according to the plurality of extremum points, and N being an integer greater than or equal to 1;
- obtaining an image segmentation region corresponding to the image feature information through an image segmentation model, the image segmentation model including N matrix input channels and a heat map input channel, the N matrix input channels having a one-to-one correspondence with the N image matrices, and the heat map input channel having a correspondence with the heat map;

processing the to-be-segmented image through a polygonal fitting function, to obtain polygon vertex information, the polygon vertex information including location information of a plurality of vertexes; and displaying the target object in the to-be-segmented image according to the polygon vertex information.

In addition, an embodiment of the present disclosure further provides a storage medium, the storage medium is configured to store program code, and the program code is configured to perform the method according to the foregoing embodiments.

An embodiment of the present disclosure further provides a computer program product including instructions, and when run on a server, the instructions cause the server to perform the method according to the foregoing embodiments.

A person skilled in the art can clearly understand that, for convenience and conciseness of description, for specific working processes of the foregoing systems, apparatuses, and units, reference may be made to the corresponding processes in the foregoing method embodiments, and details are not described herein again.

In the several embodiments provided in the present disclosure, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be omitted or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related art, or all or a part of the technical solutions may be implemented in the form of a software product. The computer software product is stored in a storage medium and includes several instructions for instructing a computer device (which may be a PC, a server or a network device) to perform all or some of the steps of the method described in the embodiments of the present disclosure. The foregoing storage medium includes: any medium that can store program code, such as a USB flash drive, a removable hard disk, a read-only memory (read-only memory, ROM), a random access memory (random access memory, RAM), a magnetic disk or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An image recognition method, performed by an image processing device, the method comprising:

obtaining an image to be segmented, the image comprising a plurality of extremum points;

generating image feature information according to the image, the image feature information comprising N image matrices and a heat map, the heat map being generated according to the plurality of extremum points, and N being an integer greater than or equal to 1;

determining an image segmentation region corresponding to the image feature information through an image segmentation model, the image segmentation model comprising N matrix input channels and a heat map input channel, the N matrix input channels having a one-to-one correspondence with the N image matrices, and the heat map input channel having a correspondence with the heat map; and generating an image recognition result of the image according to the image segmentation region, wherein the image segmentation model comprises an encoder that encodes the image feature information to obtain a target feature map and a decoder that decodes the target feature map to obtain the image segmentation region, and determining the image segmentation region comprises:

decoding the target feature map by the decoder of the image segmentation model, to obtain a decoded image having a same size as the image to be segmented:

performing a binary classification on pixels of the single image to be segmented based on the decoded image, to obtain a first pixel set and a second pixel set, the first pixel set comprising a plurality of first pixels representing inner points of a target object pointed by the extremum points, and the second pixel set comprising second pixels representing background points of the target object; and generating the image segmentation region according to the first pixel set and the second pixel set.

2. The method according to claim 1, wherein the obtaining an image to be segmented comprises:

receiving an object annotation instruction for a to-be-processed image, the to-be-processed image comprising the target object, the object annotation instruction carrying location information of a plurality of extremum points corresponding to the target object, and the plurality of extremum points being used for identifying a contour edge of the target object; and generating the image according to the to-be-processed image in response to the object annotation instruction.

3. The method according to claim 2, wherein the location information of the plurality of extremum points comprises first extremum point location information, second extremum point location information, third extremum point location information, and fourth extremum point location information that separately identify a periphery of the contour edge of the target object.

4. The method according to claim 1, wherein after the obtaining an image segmentation region corresponding to the image feature information through an image segmentation model, the method further comprises:
receiving a first adjustment instruction for a first vertex, the first vertex pertaining to an edge point of the image segmentation region, and the first vertex corresponding to first location information; and
scaling down the image segmentation region in response to the first adjustment instruction, to obtain a target segmentation region, the target segmentation region comprising a second vertex obtained through adjustment based on the first vertex, the second vertex corresponding to second location information, and the second location information being different from the first location information.

5. The method according to claim 1, wherein after the obtaining an image segmentation region corresponding to the image feature information through an image segmentation model, the method further comprises:
after obtaining the image recognition result, displaying the image segmentation region in the image;
receiving a post-segmentation adjustment instruction for a candidate vertex, the candidate vertex pertaining to the image segmentation region; and
scaling up the image segmentation region in response to the post-segmentation adjustment instruction, to obtain a target segmentation region, the target segmentation region comprising a target fourth vertex obtained through adjustment based on the candidate vertex.

6. The method according to claim 5, wherein receiving a post-segmentation adjustment instruction for a candidate vertex comprises:
detecting a first selection operation on the candidate vertex, the candidate vertex being a vertex of the image segmentation region; and
after the first selection operation, detecting a second selection operation on the target vertex, the target vertex being a pixel outside the image segmentation region.

7. The method according to claim 1, wherein the N matrix input channels comprise a red input channel, a green input channel, and a blue input channel, and the generating image feature information according to the image comprises:
generating the heat map according to the plurality of extremum points in the image; and
generating the N image matrices according to the image, the N image matrices comprising a first image matrix corresponding to the red input channel, a second image matrix corresponding to the green input channel, and a third image matrix corresponding to the blue input channel.

8. The method according to claim 1, wherein the obtaining an image segmentation region corresponding to the image feature information through an image segmentation model comprises:

encoding the image feature information by the encoder of the image segmentation model, to obtain a first feature map and a second feature map;
concatenating the first feature map and the second feature map, to obtain a target feature map; and
decoding the target feature map by the decoder of the image segmentation model, to obtain the image segmentation region.

9. The method according to claim 1, wherein after the obtaining an image segmentation region corresponding to the image feature information through an image segmentation model, the method further comprises:
processing the image through a polygonal fitting function, to obtain polygon vertex information, the polygon vertex information comprising location information of a plurality of vertexes; and
determining the target object from the image according to the polygon vertex information.

10. The method according to claim 9, further comprising:
annotating vertices of the image segmentation region in the image based on the polygon vertex information.

11. The method according to claim 9, further comprising:
displaying the target object in the image according to the polygon vertex information.

12. A terminal device, comprising: a memory, and a processor;
the memory being configured to store a program;
the processor being configured to execute the program in the memory and perform a plurality of operations comprising:
obtaining an image to be segmented, the image comprising a plurality of extremum points;
generating image feature information according to the image, the image feature information comprising N image matrices and a heat map, the heat map being generated according to the plurality of extremum points, and N being an integer greater than or equal to 1;
determining an image segmentation region corresponding to the image feature information through an image segmentation model, the image segmentation model comprising N matrix input channels and a heat map input channel, the N matrix input channels having a one-to-one correspondence with the N image matrices, and the heat map input channel having a correspondence with the heat map;
generating an image recognition result of the image according to the image segmentation region,
wherein the image segmentation model comprises an encoder that encodes the image feature information to obtain a target feature map and a decoder that decodes the target feature map to obtain the image segmentation region, and determining the image segmentation region comprises:
decoding the target feature map by the decoder of the image segmentation model, to obtain a decoded image having a same size as the image to be segmented:
performing a binary classification on pixels of the single image to be segmented based on the decoded image, to obtain a first pixel set and a second pixel set, the first pixel set comprising a plurality of first pixels representing inner points of a target object pointed by the extremum points, and the second pixel set comprising second pixels representing background points of the target object; and generating the image segmentation region according to the first pixel set and the second pixel set.

13. The device according to claim 12, wherein the obtaining an image to be segmented comprises:
receiving an object annotation instruction for a to-be-processed image, the to-be-processed image comprising the target object, the object annotation instruction carrying location information of a plurality of extremum points corresponding to the target object, and the plurality of extremum points being used for identifying a contour edge of the target object; and
generating the image according to the to-be-processed image in response to the object annotation instruction.

14. The device according to claim 13, wherein the location information of the plurality of extremum points comprises first extremum point location information, second extremum point location information, third extremum point location information, and fourth extremum point location information that separately identify a periphery of the contour edge of the target object.

15. The device according to claim 12, wherein after the obtaining an image segmentation region corresponding to the image feature information through an image segmentation model, the plurality of operations further comprises:
receiving a first adjustment instruction for a first vertex, the first vertex pertaining to an edge point of the image segmentation region, and the first vertex corresponding to first location information; and
scaling down the image segmentation region in response to the first adjustment instruction, to obtain a target segmentation region, the target segmentation region comprising a second vertex obtained through adjustment based on the first vertex, the second vertex corresponding to second location information, and the second location information being different from the first location information.

16. The device according to claim 12, wherein after the obtaining an image segmentation region corresponding to the image feature information through an image segmentation model, the plurality of operations further comprises:
displaying the image segmentation region;
receiving a post-segmentation adjustment instruction for a candidate vertex, the third vertex pertaining to the image segmentation region; and
scaling up the image segmentation region in response to the post-segmentation adjustment instruction, to obtain a target segmentation region, the target segmentation region comprising a target vertex obtained through adjustment based on the candidate vertex.

17. The device according to claim 12, wherein the N matrix input channels comprise a red input channel, a green input channel, and a blue input channel, and the generating image feature information according to the image comprises:
generating the heat map according to the plurality of extremum points in the image; and
generating the N image matrices according to the image, the N image matrices comprising a first image matrix corresponding to the red input channel, a second image matrix corresponding to the green input channel, and a third image matrix corresponding to the blue input channel.

18. The device according to claim 12, wherein the obtaining an image segmentation region corresponding to the image feature information through an image segmentation model comprises:
encoding the image feature information by the encoder of the image segmentation model, to obtain a first feature map and a second feature map;
concatenating the first feature map and the second feature map, to obtain a target feature map; and
decoding the target feature map by the decoder of the image segmentation model, to obtain the image segmentation region.

19. The device according to claim 12, wherein after the obtaining an image segmentation region corresponding to the image feature information through an image segmentation model, the plurality of operations further comprises:
processing the image through a polygonal fitting function, to obtain polygon vertex information, the polygon vertex information comprising location information of a plurality of vertexes; and
determining the target object from the image according to the polygon vertex information.

20. A non-transitory computer-readable storage medium, the storage medium being configured to store a computer program, the computer program, when executed by a processor, cause the processor to perform:
obtaining an image to be segmented, the image comprising a plurality of extremum points;
generating image feature information according to the image, the image feature information comprising N image matrices and a heat map, the heat map being generated according to the plurality of extremum points, and N being an integer greater than or equal to 1;
determining an image segmentation region corresponding to the image feature information through an image segmentation model, the image segmentation model comprising N matrix input channels and a heat map input channel, the N matrix input channels having a one-to-one correspondence with the N image matrices, and the heat map input channel having a correspondence with the heat map;
generating an image recognition result of the image according to the image segmentation region,
wherein the image segmentation model comprises an encoder that encodes the image feature information to obtain a target feature map and a decoder that decodes the target feature map to obtain the image segmentation region, and determining the image segmentation region comprises:
decoding the target feature map by the decoder of the image segmentation model, to obtain a decoded image having a same size as the image to be segmented:
performing a binary classification on pixels of the single image to be segmented based on the decoded image, to obtain a first pixel set and a second pixel set, the first pixel set comprising a plurality of first pixels representing inner points of a target object pointed by the extremum points, and the second pixel set comprising second pixels representing background points of the target object; and
generating the image segmentation region according to the first pixel set and the second pixel set.

* * * * *